United States Patent
Masuda

(10) Patent No.: US 8,930,467 B2
(45) Date of Patent: Jan. 6, 2015

(54) MOBILE COMMUNICATION TERMINAL

(75) Inventor: Noriyuki Masuda, Osaka (JP)

(73) Assignee: Kyocera Corporation, Kyoto (JP)

( * ) Notice: Subject to any disclaimer, the term of this patent is extended or adjusted under 35 U.S.C. 154(b) by 407 days.

(21) Appl. No.: 12/810,495

(22) PCT Filed: Dec. 24, 2008

(86) PCT No.: PCT/JP2008/073915
§ 371 (c)(1),
(2), (4) Date: Jun. 24, 2010

(87) PCT Pub. No.: WO2009/084709
PCT Pub. Date: Jul. 9, 2009

(65) Prior Publication Data
US 2010/0281126 A1    Nov. 4, 2010

(30) Foreign Application Priority Data
Dec. 27, 2007  (JP) .................................. 2007-336944

(51) Int. Cl.
G06F 15/16 (2006.01)
H04M 1/725 (2006.01)

(52) U.S. Cl.
CPC ...... *H04M 1/72552* (2013.01); *H04M 1/72566* (2013.01)
USPC .... 709/206; 455/415; 455/456.3; 379/207.03

(58) Field of Classification Search
USPC ....................... 709/206; 455/456.3
See application file for complete search history.

(56) References Cited

U.S. PATENT DOCUMENTS

| | | | |
|---|---|---|---|
| 7,373,383 B2* | 5/2008 | Boss et al. | 709/206 |
| 8,195,748 B2* | 6/2012 | Hallyn | 709/206 |
| 2006/0286970 A1* | 12/2006 | Otobe et al. | 455/415 |
| 2007/0269034 A1* | 11/2007 | Schurgin | 379/207.03 |
| 2008/0004043 A1* | 1/2008 | Wilson et al. | 455/456.3 |

FOREIGN PATENT DOCUMENTS

| | | |
|---|---|---|
| JP | H11-184778 A | 7/1999 |
| JP | 2001-318175 A | 11/2001 |
| JP | 2004-054374 | 2/2004 |
| JP | 2004-328381 | 11/2004 |
| JP | 2006-293621 | 10/2006 |

OTHER PUBLICATIONS

Notice of Reasons for Rejection dated Oct. 16, 2012, issued in counterpart Japanese Application No. 2007-336944.

* cited by examiner

*Primary Examiner* — Kyung H Shin
(74) *Attorney, Agent, or Firm* — Procopio, Cory, Hargreaves & Savitch LLP.

(57) ABSTRACT

A mobile communication terminal has an e-mail automatic reply function. The mobile communication terminal is set as to an allowable time difference, ringing and an e-mail automatic reply by an e-mail automatic reply function, and performs a domain analysis, etc. on the header information of the received e-mail message if the setting is made valid. Then, in the domain analysis, it is determined whether or not the time difference between an area (region) set by the roaming function and a region from which an e-mail message is sent is equal to or less than an allowable time difference, and if it is equal to or less than the allowable time difference, the mobile communication terminal notifies the receipt of the e-mail message by ringing. On the other hand, if the time difference is larger than the allowable time difference, the mobile communication terminal automatically sends a reply mail without notifying the receipt of the e-mail message.

14 Claims, 11 Drawing Sheets

FIG. 5
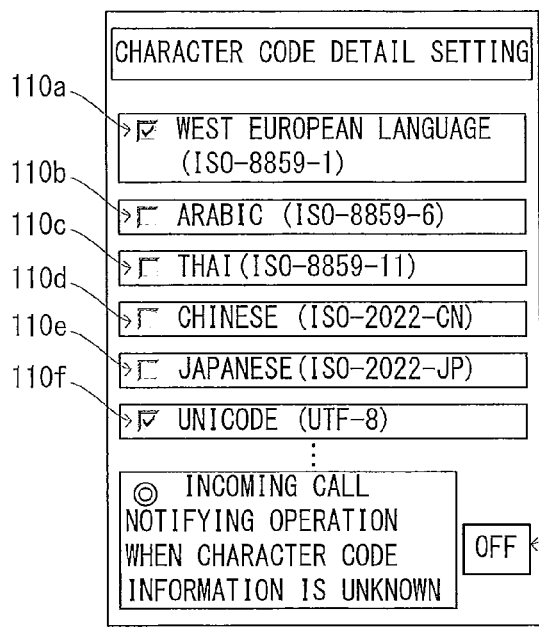
FIG. 8
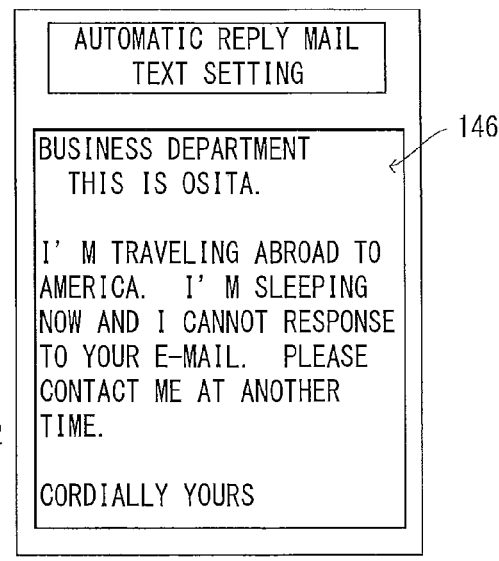
FIG. 6
(A)
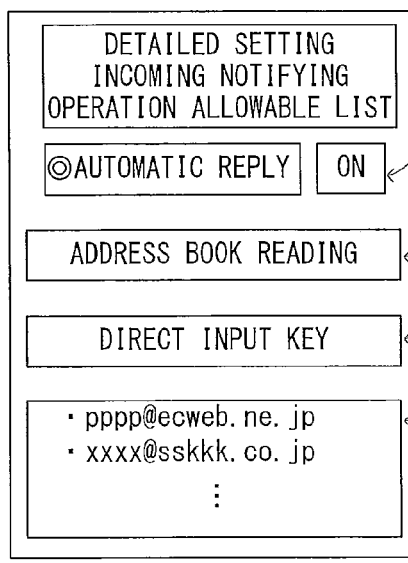
(B)
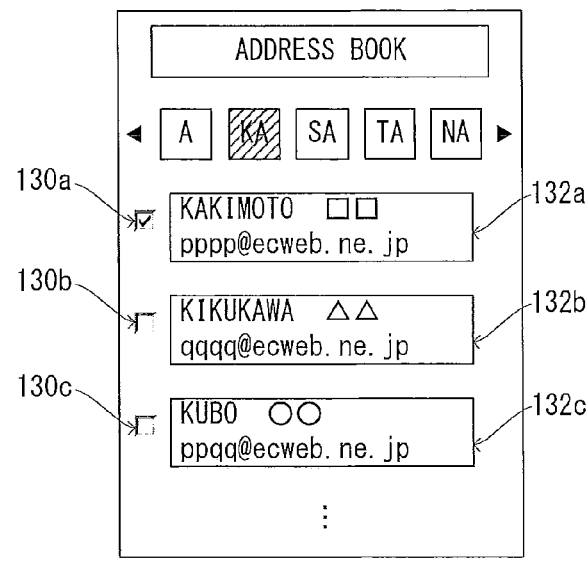

FIG. 9

```
dm → Return-Path:<xxxx@sskkk.co.jp>
     Received: from lsean.ecweb.ne.jp([000.0.000.00]) by
     nm0aimta0b.ecweb.ne.jp
rhd   id<20071130015413241.MR00.0000000@nm0aimta0b.ecweb.ne.jp>;
    → Fri, 30 Nov 2007 1:54:13 -0500

...

Received: from zzzzzzzz.sskkk.co.jp ([00.000.000.000])
     by wwwwwww.sskkk.co.jp ([10.000.000.000])
      with mapi;
      Fri, 30 Nov 2007 15:54:13 +0900
     From: <xxxx@sskkk.co.jp>
     To: <yyyy@ecweb.ne.jp>
thd → Date: Fri, 30 Nov 2007 15:54:13 +0900
     Subject: WITH RESPECT TO REGULAR DEBRIEF SESSION ON
     DECEMBER
     Thread-Topic: WITH RESPECT TO REGULAR DEBRIEF SESSION ON
     DECEMBER
     Thread-Index: Acgazl+8LLFud9kLTm6/l7apuYFQxwV6SLcg
     Message-ID: <0a0b0c0d@zzzzzzzz.sskkk.co.jp>
     Accept-Language: ja-JP
     Content-Language: ja-JP
     X-MS-Has-Attach:
     X-MS-TNEF-Correlator:
co    acceptlanguage: ja-JP
    → Content-Type: text/plain; charset="iso-2022-jp"
     Content-Transfer-Encoding: quoted-printable
```

FIG. 13

AUTOMATIC REPLY LIST

| DATE AND TIME | ADDRESS |
|---|---|
| 2007/11/23/3:50 | xxxx@sskkk.co.jp |
| 2007/11/23/4:35 | rrrr@sskkk.co.jp |
| 2007/11/24/1:20 | pqrx@sskkk.co.jp |
| ... | ... |

FIG. 14

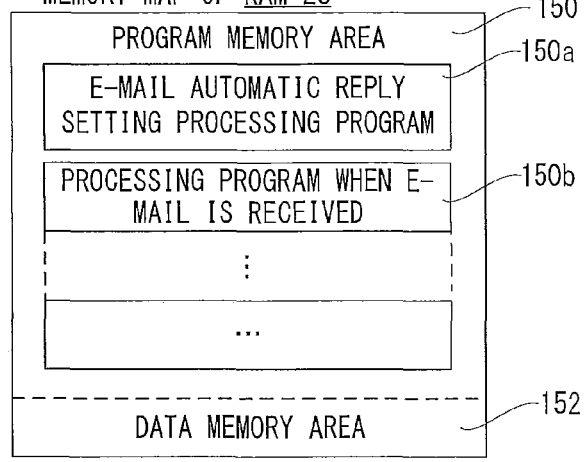

MEMORY MAP OF RAM 28

FIG. 10

DOMAIN TIME DIFFERENCE TABLE

| | | AMERICA | ENGLAND | IRAQ | HAWAII | SAIPAN | KOREA | CHINESE | THAI | INDIA | ... |
|---|---|---|---|---|---|---|---|---|---|---|---|
| DOMAIN | us | 0:00 | 5:00 | 8:00 | 5:00 | 15:00 | 14:00 | 13:00 | 12:00 | 10:30 | ... |
| | uk | 5:00 | 0:00 | 3:00 | 10:00 | 10:00 | 9:00 | 8:00 | 7:00 | 5:30 | ... |
| | iq | 8:00 | 3:00 | 0:00 | 13:00 | 7:00 | 6:00 | 5:00 | 4:00 | 2:30 | ... |
| | kr | 14:00 | 9:00 | 6:00 | 19:00 | 1:00 | 0:00 | 1:00 | 2:00 | 3:30 | ... |
| | cn | 13:00 | 8:00 | 5:00 | 18:00 | 2:00 | 1:00 | 0:00 | 1:00 | 2:30 | ... |
| | th | 12:00 | 7:00 | 4:00 | 17:00 | 3:00 | 2:00 | 1:00 | 0:00 | 1:30 | ... |
| | in | 10:30 | 5:30 | 2:30 | 15:30 | 4:30 | 3:30 | 2:30 | 1:30 | 0:00 | ... |
| | jp | 14:00 | 9:00 | 6:00 | 19:00 | 1:00 | 0:00 | 1:00 | 2:00 | 3:30 | ... |
| | ... | ... | ... | ... | ... | ... | ... | ... | ... | ... | ... |

FIG. 12

HEADER TIME DIFFERENCE TABLE

| HEADER OF RECEIVING END \ HEADER OF SENDING END | -1200 | -1100 | -1000 | ... | 0000 | +0100 | +0200 | ... | +0900 | ... | +1300 |
|---|---|---|---|---|---|---|---|---|---|---|---|
| -1200 | 0:00 | 1:00 | 2:00 | ... | 12:00 | 13:00 | 14:00 | ... | 21:00 | ... | 25:00 |
| ... | ... | ... | ... | ... | ... | ... | ... | ... | ... | ... | ... |
| -0500 | 7:00 | 6:00 | 5:00 | ... | 5:00 | 6:00 | 7:00 | ... | 14:00 | ... | 18:00 |
| ... | ... | ... | ... | ... | ... | ... | ... | ... | ... | ... | ... |
| 0000 | 12:00 | 11:00 | 10:00 | ... | 0:00 | 1:00 | 2:00 | ... | 9:00 | ... | 13:00 |
| +0100 | 13:00 | 12:00 | 11:00 | ... | 1:00 | 0:00 | 1:00 | ... | 8:00 | ... | 12:00 |
| +0200 | 14:00 | 13:00 | 12:00 | ... | 2:00 | 1:00 | 0:00 | ... | 7:00 | ... | 11:00 |
| ... | ... | ... | ... | ... | ... | ... | ... | ... | ... | ... | ... |
| +1100 | 23:00 | 22:00 | 21:00 | ... | 11:00 | 10:00 | 9:00 | ... | 2:00 | ... | 2:00 |
| +1200 | 24:00 | 23:00 | 22:00 | ... | 12:00 | 11:00 | 10:00 | ... | 3:00 | ... | 1:00 |
| +1300 | 25:00 | 24:00 | 23:00 | ... | 13:00 | 12:00 | 11:00 | ... | 4:00 | ... | 0:00 |

| CHARACTER CODE TIME DIFFERENCE TABLE | | AMERICA | ENGLAND | IRAQ | HAWAII | SAIPAN | KOREA | CHINESE | THAI | INDIA | ... |
|---|---|---|---|---|---|---|---|---|---|---|---|
| | WEST EUROPEAN LANGUAGE | 5:00 | 0:00 | 3:00 | 10:00 | 10:00 | 9:00 | 8:00 | 7:00 | 5:30 | ... |
| | ARABIC | 8:00 | 3:00 | 0:00 | 13:00 | 7:00 | 6:00 | 5:00 | 4:00 | 2:30 | ... |
| CHARACTER CODE | THAI | 12:00 | 7:00 | 4:00 | 17:00 | 3:00 | 2:00 | 1:00 | 0:00 | 1:30 | ... |
| | CHINESE | 13:00 | 8:00 | 5:00 | 18:00 | 2:00 | 1:00 | 0:00 | 1:00 | 2:30 | ... |
| | JAPANESE | 14:00 | 9:00 | 6:00 | 19:00 | 1:00 | 0:00 | 1:00 | 2:00 | 3:30 | ... |
| | UNICODE | 0:00 | 0:00 | 0:00 | 2:00 | 1:00 | 1:00 | 0:00 | 1:00 | 2:30 | ... |
| | ... | ... | ... | ... | ... | ... | ... | ... | ... | ... | ... |

MOBILE COMMUNICATION TERMINAL

TECHNICAL FIELD

The present invention relates to a mobile communication terminal. More specifically, the present invention relates to a mobile communication terminal which sends and receives an e-mail message.

BACKGROUND ART

An example of this kind of an apparatus is disclosed in Japanese Patent Application Laid-Open No. 2004-54374 [G06F 13/00, H04M 1/00, H04M 1/57, H04Q 7/38] (Patent Document 1) laid-open on Feb. 19, 2004. According to the background art, the mobile communication terminal apparatus has a memory for registering a plurality of sets of an e-mail address book, a name, an attribute and a priority rank, and a controller for detecting whether or not a mail address sent from an exchange when there is an incoming mail and an mail address within the memory are coincident, and controlling, when it is detected that the mail addresses are coincident, ringing of a mail incoming call tone and a vibrator on the basis of the attribute information and the priority rank information of the mail address. That is, the controller notify or does not notify incoming mail by controlling ringing of a mail incoming call tone and a vibrator on the basis of the set attribute information and priority rank information.

However, in the background art of the Patent Document 1, in a case that a region where a sender of an e-mail message stays and a region where a user using a mobile communication terminal apparatus which receives the e-mail message stays are different, the controller cannot control ringing of a mail incoming call tone and a vibrator on the basis of the difference of the regions. In a case a Japanese uses a mobile communication terminal apparatus in United States, or the like, when an e-mail message is sent from Japan, the sender of the e-mail message and the receiver are likely to live according to different daily rhythms due to 14 hours of the time difference between Japan and America. That is, when an e-mail message is received during user's sleep, the user may be awakened due to the ringing of the mobile communication terminal apparatus. Furthermore, even if the mobile communication terminal apparatus can be controlled so as not to ring during user's sleep, when an e-mail message informing an emergent requirement is sent from another e-mail sender in the same region as the user, the user cannot notice the incoming of the e-mail message notifying the emergent requirement.

SUMMARY OF THE INVENTION

Therefore, it is a primary object of the present invention to provide a novel mobile communication terminal.

Another object of the present invention is to provide a mobile communication terminal capable of controlling a notification of receipt of an e-mail message depending on a region from which the e-mail message is sent.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a mobile communication terminal comprising a receiver which receives an e-mail message, a receiving region specifier which specifies a receiving region where the receiver receives an e-mail message, an analyzer which analyzes the e-mail message received by the receiver, a sending region specifier which specifies a sending region from which the received e-mail message is sent from an analysis result by the analyzer, a time difference acquirer which acquires a time difference between the receiving region and the sending region, and a determiner which determines whether or not a receipt notifying operation of the e-mail message is to be performed on the basis of the time difference acquired by the time difference acquirer.

In the first invention, a receiver (12, 14, 20) of a mobile communication terminal (10) receives an e-mail message. A receiving region specifier (20, 28, 50) specifies a receiving region where the receiver receives an e-mail message. An analyzer (20, 174, S41, S47, S55) analyzes the e-mail message received by the receiver. A sending region specifier (20, S41, S47, S55) specifies a sending region from which the received e-mail message is sent from an analysis result by the analyzer. A time difference acquirer (20, 152d, 152e, 152f, S43, S51, S57) acquires a time difference between the receiving region and the sending region. A determiner (20, 77, S85, S91) determines whether or not a receipt notifying operation of the e-mail message is to be performed on the basis of the time difference acquired by the time difference acquirer.

Accordingly, when receiving an e-mail message, the mobile communication terminal specifies a receiving region from which the received e-mail message is sent by analyzing the e-mail message. Then, on the basis of the time difference between the receiving region and the sending region which acquired by the time difference acquirer, the determiner can determine whether or not a receipt notifying operation of the e-mail message is to be performed.

According to the first invention, on the basis of the time difference between the receiving region and the sending region, whether or not a receipt notifying operation of an e-mail message is to be performed can be determined, and therefore, the user can cause the mobile communication terminal to control a receipt notification of an e-mail message depending on where an e-mail message is sent from.

A second invention is according to the first invention, and further comprises a time difference storage which stores a set time difference, wherein the determiner determines that the receipt notifying operation of the e-mail message is to be executed when the time difference acquired by the time difference acquirer is equal to or less than the time difference stored in the time difference storage.

In the second invention, a time difference storage (28, 170) stores a time difference set by the user or the like. The determiner determines that the receipt notifying operation of the e-mail message is executed when the time difference acquired by the time difference acquirer is equal to or less than the time difference stored in the time difference storage. Accordingly, if the time difference between the receiving region and the sending region is equal to or less than the set time difference, the determiner determines a receipt notifying operation of the e-mail message is executed. For example, in a case that the user receives an e-mail message sent from a region where the user himself or herself exists, a notification of receipt of the e-mail message is set to be executed.

According to the second invention, the mobile communication terminal can select execution of a notification of reception of the e-mail message when the time difference between the region specified by the region specifier and the region specified by the sending region specifier is equal to or less than the set time difference. Thus, in a case that an e-mail message sent from a region intended by the user is received, the mobile communication terminal can perform a notification of receipt of the e-mail message.

A third invention is according to the first invention, and the sending region specifier specifies the sending region from domain information included in the e-mail message.

According to the third invention, the sending region is specified from domain information (dm) included in the e-mail message.

A fourth invention is according to the first invention, and the sending region specifier specifies the sending region from a character code included in the e-mail message.

In the fourth invention, the sending region is specified from character code information (co) included in the e-mail message.

A fifth invention is according to the first invention, and the sending region specifier specifies the sending region from a time difference with respect to a universal time included in the e-mail message.

In the fifth invention, the sending region is specified from a time difference with respect to the universal time (rhd, thd) included in the e-mail message.

According to the third to fifth inventions, the sending region is specified from at leas one of the domain information, the character code information and the time difference with respect to the universal time which are included in the e-mail message. Accordingly, the time difference acquirer can acquire the time difference between the receiving region and the sending region.

A sixth invention is according to the first invention, and further comprises a sender information list storage which stores a sender information list including information of a specific sender, wherein the analyzer includes a sender specifier which specifies a sender of the received e-mail message, and the determiner which determines that the receipt notifying operation of the e-mail message is to be executed when the sender specified by the sender specifier is included in the sender information list.

In the sixth invention, a sender information list storage (28, 178) stores a sender information list (incoming notifying operation allowable list) including the information of a specific sender. A sender specifier (20, S29, S31) specifies a sender of the received e-mail message. A determiner determines that the receipt notifying operation of the e-mail message is to be executed when the sender specified by the sender specifier is included in the sender information list. Accordingly, when receiving an e-mail message, the mobile communication terminal specifies a sender of the e-mail message from the analysis result of the e-mail message. Then, if the specified sender is included in the sender information list, the determiner determines that a receipt notifying operation of the e-mail message is to be performed.

According to the sixth invention, from an analysis result of the received e-mail message, the mobile communication terminal specifies a sender of the e-mail message, and if the e-mail message from the specific sender included in the sender information list is received, it is possible to notify the user that the e-mail message is received.

A seventh invention is according to the first invention, and further comprises a set time storage which sets a set time, and the analyzer performs an analysis of the e-mail message if a receiving time of the received e-mail message is within the set time.

In the seventh invention, a set time storage stores a set time. Then, the analyzer performs an analysis of the e-mail message if a receiving time of the received e-mail message is within the set time.

According to the seventh invention, the analysis of the received e-mail message is not performed unless the receiving time of the received e-mail message is within the set time. That is, the user can arbitrarily set the time when receipt of an e-mail message is notified.

An eighth invention is according to the first invention, and further comprises a replier which automatically sends a reply mail in response to the received e-mail message when the determiner determines that the receipt notifying operation of the e-mail message is not to be executed.

In the eighth invention, a replier automatically sends a reply mail in response to the received e-mail message when the determiner determines that the receipt notifying operation of the e-mail message is not to be executed. Accordingly, the mobile communication terminal automatically sends the reply mail in response to the received e-mail message if a notification of the received e-mail message is not executed.

According to the eighth invention, if a notification of the received e-mail message is not performed, the reply mail can be sent in response to the received e-mail message, and therefore, it is possible to quickly inform the sender of the e-mail message of a situation of the user.

A ninth invention is according to the eighth invention, and further comprises a reply partner information storage which stores information of a reply partner, and the replier automatically sends the reply mail when the information of the sender of the received e-mail message does not match the information of the reply partner stored in the reply partner information storage.

In the ninth invention, a reply partner information storage (28, 152g) stores information of a reply partner. Then, when the information of the sender of the received e-mail message does not match the information of the reply partner stored in the reply partner information storage, the replier automatically sends the reply mail. Accordingly, in a case that a reply is made with respect to the received e-mail message, if a reply mail has already been sent to the reply partner, the reply mail is not automatically sent again.

According to the ninth invention, in a case that a reply is made with respect to the received e-mail message, the reply mail has already been sent to the reply partner, the reply mail can be made so as not to be automatically sent. That is, it is possible to prevent the reply mail from being sent to the same reply partner again and again.

A tenth invention is a storage medium readably storing a mail controlling program by a computer of a mobile communication terminal having a receiver which receives an e-mail message, the mail controlling program causes the computer to execute a receiving region specifying step for specifying a receiving region where the receiver receives an e-mail message; an analyzing step for analyzing the e-mail message received by the receiver; a sending region specifying step for specifying a sending region from which the received e-mail message is sent from an analysis result by the analyzing step; a time difference acquiring step for acquiring a time difference between the receiving region and the sending region, and a determining step for determining whether or not a receipt notifying operation of the e-mail message is to be executed on the basis of the time difference acquired by the time difference acquiring step.

In the tenth invention as well, similar to the first invention, the user can cause the mobile communication terminal to control a notification of receipt of an e-mail message depending on where the e-mail message is sent from.

An eleventh invention is a mail controlling method of a mobile communication terminal having a receiver which receives an e-mail message, including steps of: a receiving region specifying step for specifying a receiving region where the receiver receives an e-mail message; an analyzing step for analyzing the e-mail message received by the receiver; a sending region specifying step for specifying a sending region from which the received e-mail message is sent from an analysis result by the analyzing step; a time difference acquiring step for acquiring a time difference between the receiving region and the sending region, and a determining step for determining whether or not a receipt notifying operation of the e-mail message is to be executed on the basis of the time difference acquired by the time difference acquiring step.

In the eleventh invention as well, similar to the first invention, the user can cause the mobile communication terminal to control a notification of receipt of an e-mail message depending on where the e-mail message is sent from.

According to the present invention, whether or not a receipt notifying operation of an e-mail message is to be performed can be determined on the basis of the time difference between the receiving region and the sending region, and therefore, the user can cause the mobile communication terminal to control a notification of receipt of an e-mail message depending on where the e-mail message is sent from.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing one example of a display of a GUI for making setting of character code information to be analyzed belonging to the e-mail automatic reply function of the mobile communication terminal shown in FIG. 1.

FIG. 6(A) is an illustrative view showing one example of a display of a GUI for making detailed setting of a incoming notifying operation allowable list belonging to the e-mail automatic reply function of the mobile communication terminal shown in FIG. 1, and FIG. 6(B) is an illustrative view showing another example of the display of the GUI for making detailed setting of the incoming notifying operation allowable list belonging to the e-mail automatic reply function of the mobile communication terminal shown in FIG. 1.

FIG. 8 is an illustrative view showing one example of a GUI display for setting a text of an automatic reply mail belonging to the e-mail automatic reply function of the mobile communication terminal shown in FIG. 1.

FIG. 9 is an illustrative view showing a part of header information of a certain e-mail message received by the mobile communication terminal shown in FIG. 1.

FIG. 10 is an illustrative view showing one example of a domain time difference table stored in the RAM shown in FIG. 1.

FIG. 12 is an illustrative view showing one example of a header time difference table stored in the RAM shown in FIG. 1.

FIG. 13 is an illustrative view showing one example of an automatic reply list stored in the RAM shown in FIG. 1.

FIG. 14 is an illustrative view showing one example of a memory map of the RAM shown in FIG. 1.

BEST MODE FOR PRACTICING THE INVENTION

Figure 1:
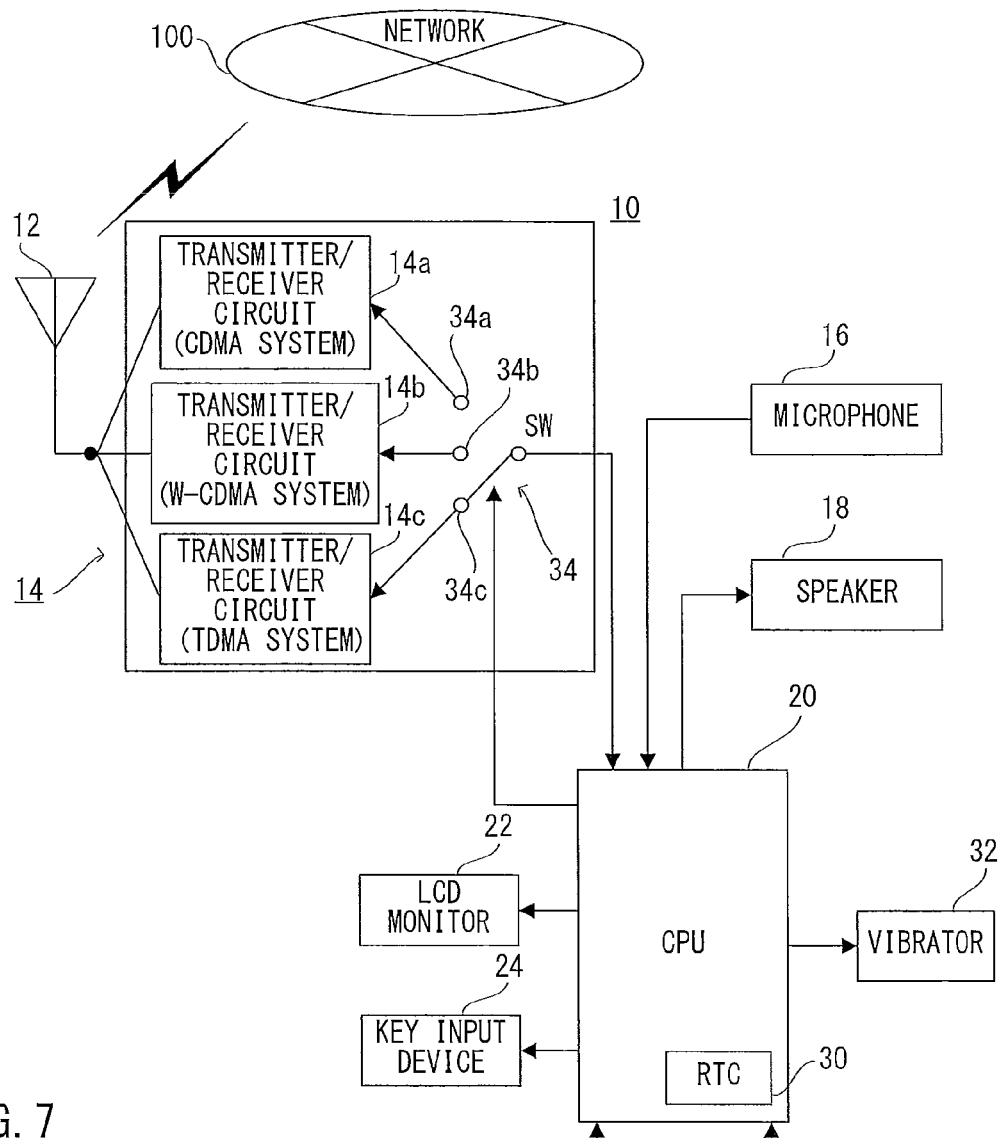
FIG. 1 is a block diagram showing a mobile communication terminal of one embodiment of an invention of a first embodiment.

Referring to FIG. 1, a mobile communication terminal 10 includes a key input device 24, and has a roaming function usable in various regions. Thus, a transmitter/receiver circuit 14 has to have a transmitter/receiver circuit in communication systems to be used in various regions, and the transmitter/receiver circuit 14 in this embodiment includes a transmitter/receiver circuit in a CDMA system 14a, a transmitter/receiver circuit in a W-CDMA system 14b and a transmitter/receiver circuit in a TDMA system 14c, and further includes a SW 34 for switching the transmitter/receiver circuits 14a-14c. The SW 34 is controlled by the CPU 20. Then, when a roaming function is executed by a user to make an area (region) setting, the CPU 20 switches the SW 34 such that the transmitter/receiver circuit 14 corresponding to the selected region is connected to the CPU 20. Here, transmitter/receiver circuits in other various systems may be included in the transmitter/receiver circuit 14 beyond the CDMA system, the W-CDMA system and the TDMA system.

Here, when a call-out operation is performed by the key input device 24, the CPU 20 controls the transmitter/receiver circuit 14 to output a calling signal. The output calling signal is output from an antenna 12, and sent to a mobile communication network including base stations. When an intended party makes a response operation, a communication allowable state is established.

When a conversation end operation is performed by the key input device 24 after a transition to a communication allowable state, the CPU 20 controls the transmitter/receiver circuit 14 to send a conversation end signal to the intended party. After transmission of the conversation end signal, the CPU 20 ends the telephone communication processing. Also, in a case that a conversation end signal is received from the intended party, the CPU 20 ends the telephone communication processing. Furthermore, in a case that a conversation end signal is received from the mobile communication network irrespective of the intended party as well, the CPU 20 ends the telephone communication processing.

When a calling signal from the intended party is received by the antenna 12 in a state that the entire system is activated, the transmitter/receiver 14 notifies the incoming call to the CPU 20. The CPU 20 outputs calling source information described in the incoming call notification to an LCD monitor 22, vibrates a vibrator 32, and outputs an incoming call tone from an incoming call notifying speaker not shown. When a response operation is performed by the key input device 24, a communication allowable state is established. It should be noted that an operation of outputting an incoming call tone, and vibrating the vibrator 32 is called an "incoming call notifying operation" in this embodiment.

In the communication allowable state, following processing is executed. A modulated audio signal (high frequency signal) sent from the intended party is received by the antenna 12. The received modulated audio signal undergoes demodulation processing and decode processing by the transmitter/receiver circuit 14. The received voice signal thus obtained is output from the speaker 18. A voice signal to be transmitted which is taken by the microphone 16 undergoes encoding processing and modulation processing by the transmitter/receiver circuit 14. The modulated audio signal thus generated is sent to the intended party by utilizing the antenna 12 in the same manner as described above.

Furthermore, when a data communication operation with the network 100 is performed by the key input device 24, the CPU 20 starts communications with the network 100 through the antenna 12 and the transmitter/receiver circuit 14. The network 100 is connected with a plurality of network servers not shown, and the CPU 20 performs data communications with each of the plurality of network servers via the network 100. The LCD monitor 22 displays images, letters and the like which are obtained through the data communications. Furthermore, the mobile communication terminal 10 has an e-mail (electronic mail) receiving/sending function, and is able to send and receive e-mail messages over the network 100. Additionally, in a case that an e-mail message is received, the transmitter/receiver circuit 14 notifies the CPU 20 of receipt of the e-mail message similar to the incoming case. The CPU 20 outputs to the LCD monitor 22 source information from header information, etc. of the e-mail message, and causes the mobile communication terminal 10 to perform an incoming call notifying operation.

In addition, the mobile communication terminal 10 has a time displaying function, etc. The time displaying function is a function to display the time information generated by the RTC (Real Time Clock) 30 on the LCD monitor 22. For example, if the generated time information is "2007/10/31/ 10:30", the RTC 30 displays Nov. 31, 2007 and 10:30 on the LCD monitor 22. Furthermore, the time displaying function has a Japanese-time-displaying mode and a foreign-time-displaying mode.

Figure 2:
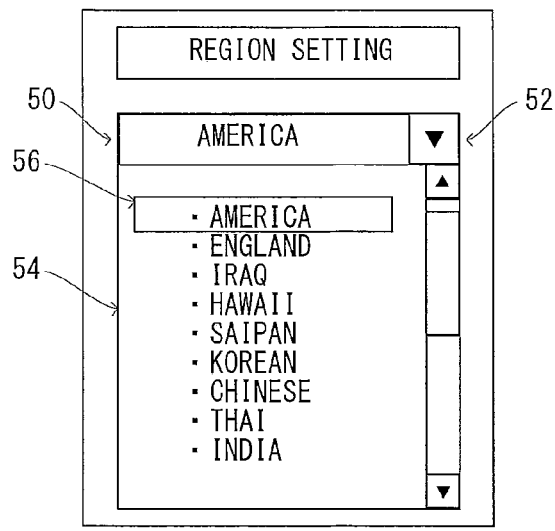
FIG. 2 is an illustrative view showing one example of a display of a GUI belonging to a roaming function of the mobile communication terminal shown in FIG. 1.

FIG. 2 is an illustrative view showing an example of a display of a GUI (Graphical User Interface) for making a region setting by a roaming function. Referring to FIG. 2, the GUI for making a region setting is displayed on the LCD monitor 22, and includes a set region display 50 and a down direction key 52. A user operates the down direction key 52 to thereby further display a selection region list 54 and a cursor 56 on the LCD monitor 22. Furthermore, the down direction key 52 is operated by the key input device 24. It should be noted that all the GUIs explained in this embodiment are operated with the key input device 24.

In a case that the region is set to America here, the cursor 56 is operated to select the display of America and performs an operation of completing the region selection as shown in FIG. 2, "America" can be displayed on the set region display 50, which make the mobile communication terminal 10 usable in America. Then, the set region is stored in the RAM 28. Here, the settable region is not restricted to the regions displayed in FIG. 2, and more regions are settable.

Next, explained is an e-mail automatic reply function in which in a case that an e-mail message is received, the mobile communication terminal 10 is set to perform an automatic reply of e-mail without performing an incoming call notifying operation depending on the time zone set by the user, and the mobile communication terminal 10 can be set to perform an incoming call notifying operation without performing an automatic reply of e-mail depending on a sender of an e-mail message.

Figure 3:
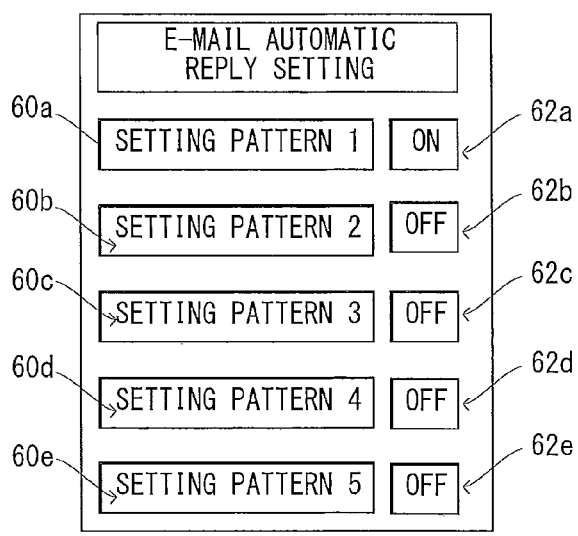
FIG. 3 is an illustrative view showing one example of a display of a GUI belonging to an e-mail automatic reply function of the mobile communication terminal shown in FIG. 1.
Figure 4:
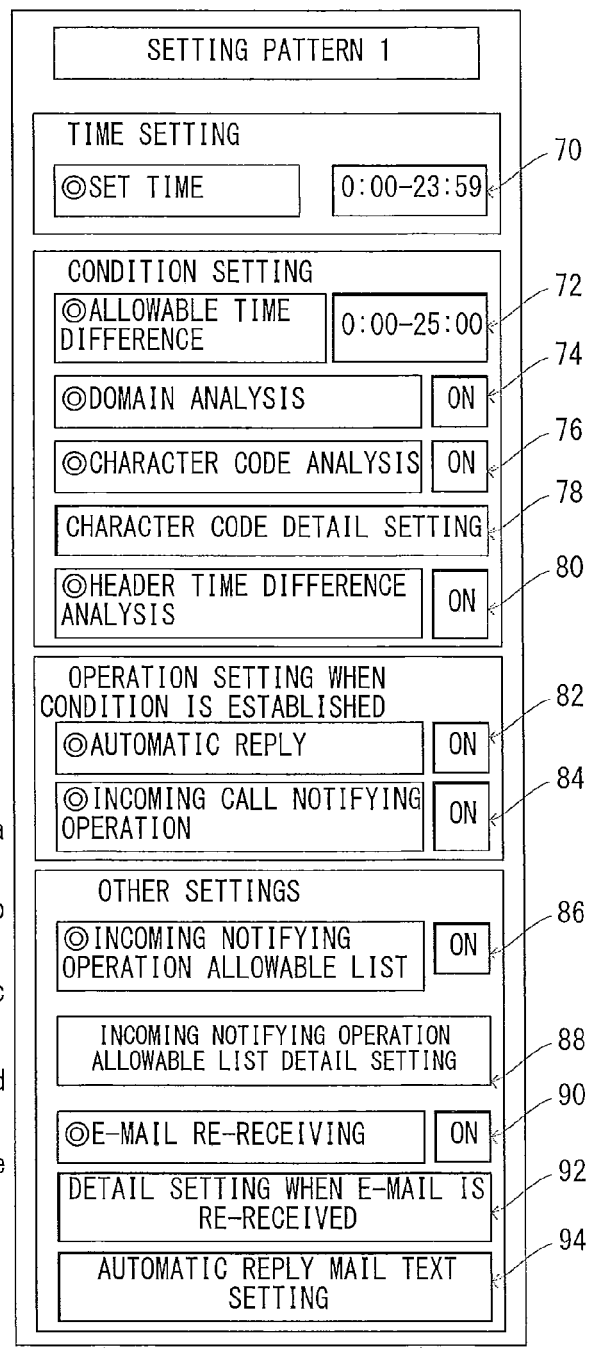
FIG. 4 is an illustrative view showing another example of a display of the GUI belonging to the e-mail automatic reply function of the mobile communication terminal shown in FIG. 1.

First, by utilizing FIG. 3-FIG. 8, the GUI of the e-mail automatic reply function is explained. FIG. 3 is an illustrative view showing a display example of a GUI for setting an e-mail automatic reply belonging to the e-mail automatic reply function. Referring to FIG. 3, in the setting of an e-mail automatic reply, five kinds of setting patterns from a setting pattern 1 to a setting pattern 5 are registered, and "ON (valid)" and "OFF (invalid)" can be set as to each setting pattern. More specifically, when a setting pattern 1 key 60a is operated, a GUI for making detailed setting of the setting pattern 1 shown in FIG. 4 is displayed on the LCD monitor 22. Here, the GUI for making detailed setting of the setting pattern 1 is described later, and therefore, the detailed explanation is omitted here.

Returning to FIG. 3, an operation when each of a setting pattern 2 key 60b, a setting pattern 3 key 60c, a setting pattern 4 key 60d and a setting pattern 5 key 60e is operated is the same as that when the setting pattern 1 key 60a is operated, and therefore, a detailed explanation is omitted. It should be noted that it is needless to say that the kind of the setting pattern is six kinds or more.

Furthermore, when an ON/OFF key 62a is operated, the display of the ON/OFF key 62a is switched. For example, in a case that the ON/OFF key 62a is operated in a state that an ON display is made, this is switched to the OFF display, and in a case that the ON/OFF key 62a is operated in a state that the OFF display is made, this is switched to the ON display. Then, the ON/OFF key 62a is set to an on-state to make the setting pattern 1 valid. That is, an e-mail automatic reply is performed following the setting by the setting pattern 1. Here, the state of the ON/OFF key 62a is stored in the RAM 28.

In addition, an ON/OFF key 62b is set to an on-state to make the setting pattern 2 valid, an ON/OFF key 62c is set to an on-state to make the setting pattern 3 valid, an ON/OFF key 62d is set to an on-state to make the setting pattern 4 valid, and an ON/OFF key 62e is set to an on-state to make the setting pattern 5 valid. Here, the keys of the GUI making an ON or OFF display can be switched as in the ON/OFF key 62a.

FIG. 4 is an illustrative view showing an example of a display of a GUI for making detailed setting of the setting pattern 1 belonging to the e-mail automatic reply function. Referring to FIG. 4, as described before, in a case that the setting pattern 1 key 60a (see FIG. 3) is operated, a GUI for making detailed setting of the setting pattern 1 is displayed on the LCD monitor 22. As to the GUI displayed on the LCD monitor 22, a time setting for setting a time when an e-mail automatic reply function is operated, a condition setting for setting in detail an analysis condition of header information of the received e-mail, an operation setting when a condition is established for setting an operation when the set condition is established, and other setting for setting a text of an automatic reply mail can be performed.

As to the time setting, a set time key 70 is operated to make a time when an e-mail automatic reply function is activated settable. For example, in a case that "1:00-6:00" is input by the key input device 24, "1:00-6:00" is displayed on the set time key 70. Furthermore, if "1:00-6:00" is displayed on the set time key 70, an e-mail automatic reply is performed from 1.00 a.m. to 6.00 a.m. Then, the set time period is stored in the RAM 28. In this embodiment, the time zone can be set every minute from 0:00 to 23:59, but this may be set at arbitrary time intervals, such as every 30 minute and every hour.

The condition setting is for setting an analysis condition of the header information of the received e-mail message. In this embodiment, whether or not any one or more of a domain analysis, a character code analysis and a header time difference analysis is performed or not is set. Then, a time difference between a region to which an e-mail message is sent and a region where the user stays can be acquired by performing each analysis. Then, the user sets an allowable time difference for the evaluated time difference, and performs an operation set by the operation setting at a time when a condition is established when the evaluated time difference is within the allowable time difference.

More specifically, when the allowable time difference key 72 is operated, the allowable time difference can be. For example, if "0:00-5:00" is input by the key input device 24, "0:00-5:00" is displayed on the allowable time difference key 72. When a domain analysis ON/OFF key 74 is operated, whether or not a time difference is evaluated from the domain information included in the e-mail address can be set. When a character code analysis ON/OFF key 76 is operated, whether or not a time difference is evaluated from the character code information can be set. Furthermore, when a character code detail setting key 78 is operated, a GUI for setting character code information to be analyzed shown in FIG. 5 is displayed on the LCD monitor 22. The GUI for setting the character code information to be analyzed shown in FIG. 5 is described later, and therefore, the detailed explanation is omitted here. Returning to FIG. 4, when a header time difference analysis ON/OFF key 80 is operated, whether or not time difference information is evaluated from the header information can be set. Then, each of the set condition is stored in the RAM 28. Here, in this embodiment, the set time difference can be set every 30 minute from 0:00 to 25:00, but this can be at arbitrary time intervals, such as every 15 minute, every hour, etc.

As to the operation setting at a time when a condition is established, when an automatic reply ON/OFF key 82 is operated, whether or not the mobile communication terminal 10 is caused to perform an e-mail automatic reply when a condition set by the condition setting is established can be set. Then, when an incoming call notifying operation ON/OFF key 84 is operated, whether or not the mobile communication terminal 10 is caused to perform an incoming call notifying operation when the aforementioned condition is established can be set. Then, the operation at a time when the set condition is established is stored in the RAM 28.

As to the other settings, in a case that an e-mail message including a specific address in the header information is received, setting as to whether or not the mobile communication terminal 10 is caused to perform an incoming call notifying operation (setting of the incoming notifying operation allowable list), setting of deciding a specific address included in the incoming notifying operation allowable list (detailed setting of the incoming notifying operation allowable list), setting when an e-mail message including the same address in the header information is received twice or more within a predetermined time period (setting when e-mail is re-received), detailed setting at a time when e-mail is re-received, setting of creating a text of an automatic reply mail can be performed.

More specifically, when an incoming notifying operation allowable list ON/OFF key 86 is operated, an incoming notifying operation allowable list can be set. Then, when an incoming notifying operation allowable list detail setting key 88 is operated, a GUI for making the setting of the incoming notifying operation allowable list shown in FIG. 6(A) is displayed on the LCD monitor 22. Here, the GUI for making the setting of the incoming notifying operation allowable list shown in FIG. 6(A) is described later, and therefore, the detailed explanation is omitted here.

Figure 7:
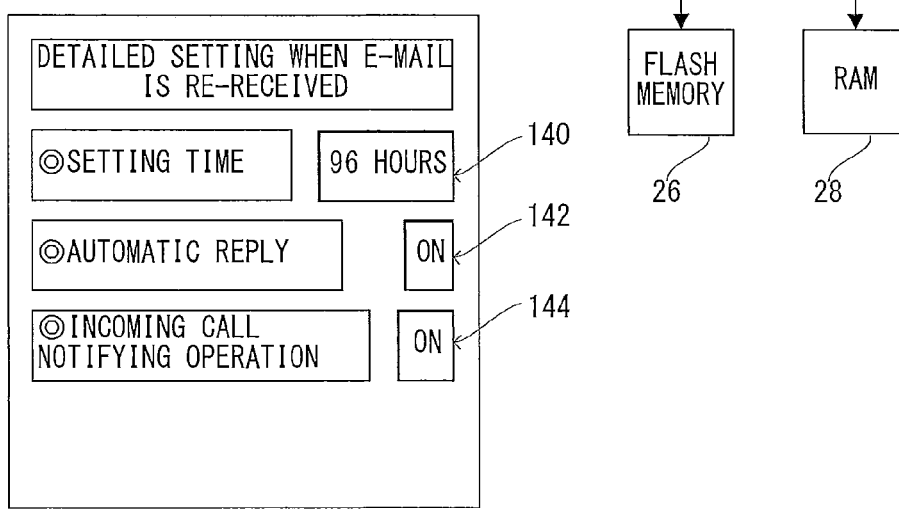
FIG. 7 is an illustrative view showing one example of a display of a GUI for making setting when an e-mail message is re-received belonging to the e-mail automatic reply function of the mobile communication terminal shown in FIG. 1.

Returning to FIG. 4, when an e-mail re-receiving ON/OFF key 90 is operated, re-receiving an e-mail message can be set. Then, an detail setting key at a time when e-mail is re-received 92 is operated, a GUI for making a detailed setting at a time when e-mail is re-received shown in FIG. 7 is displayed on the LCD monitor 22. Here, the GUI for making a detailed setting at a time when e-mail is re-received shown in FIG. 7 is described later, and therefore, the detailed explanation is omitted here.

Returning to FIG. 4, when an automatic reply mail text setting key 94 is operated, a GUI for making setting of a text of an e-mail message for an automatic reply shown in FIG. 8 is displayed on the LCD monitor 22. Here, the GUI for making setting of a text of an e-mail message for an automatic reply is described later, and therefore, the detailed explanation is omitted. Then, the set other settings are stored in the RAM 28.

FIG. 5 is an illustrative view showing an example of a display of a GUI for setting the character code information to be analyzed belonging to the e-mail automatic reply function. Referring to FIG. 5, the character code information to be analyzed includes West European languages (ISO-8859-1), Arabic (ISO-8859-6), Thai (ISO-8859-11), Chinese (ISO-2022-CN), Japanese (ISO-2022-JP) and Unicode (UTF-8), etc. Then, when the user operates the key input device 24 to check a check box 110a, the character code information of the West European language (ISO-8859-1) is set to be analyzed. Furthermore, a check box 110b corresponds to Arabic (ISO-8859-6), a check box 110c corresponds to Thai (ISO-8859-11), a check box 110d corresponds to Chinese (ISO-2022-CN), a check box 110e corresponds to Japanese (ISO-2022-CN), a check box 110f corresponds to Unicode (UTF-8). When any one of them is checked by the user, the character code information of the corresponding language is set to be analyzed. Here, Unicode is languages within English-speaking countries, and is character code information used in America, England and a region where English is used as an official language.

In addition, when an incoming call notifying operation ON/OFF key at a time when the character code information is unknown 112 is operated, whether or not the mobile communication terminal 10 is caused to perform an incoming call notifying operation when a character code analysis result of the received e-mail message does not match the character code information stored in the mobile communication terminal 10 (is unknown) can be set.

Then, the setting of the character code information to be analyzed and the setting when the character code information analysis result is unclear or impossible are stored in the RAM 28. Here, as to the West European languages, the character code information to be analyzed may be ISO-8859-15, US-ASCII, etc. other than ISO-8859-1, and as to other languages, a plurality of character code information can be set in addition to one type of character code information. In addition, it is needless to say that character code information of other regions may be set.

FIG. 6(A) is an illustrative view showing one example of a GUI for making a detailed setting of the incoming notifying operation allowable list belonging to the e-mail automatic reply function. Referring to FIG. 6(A), in a case that the incoming notifying operation allowable list is set, when an automatic reply ON/OFF key 120 is operated, whether or not an automatic reply is to be performed can be set. Then, when an address book reading key 122 or a direct input key 124 is operated, an specific address included in the incoming notifying operation allowable list can be set, and the set specific address is displayed on an incoming notifying operation allowable list display area 126.

Here, when the address book reading key 122 is operated, a GUI showing an address book stored in the mobile communication terminal 10 shown in FIG. 6(B) is displayed on the LCD monitor 22. In the address book stored in the mobile communication terminal 10, an address and a name of the person corresponding to the address are brought into correspondence with each other. Then, the address and the name are displayed as in address displays 132a-132c. Then, when the user operates the key input device 24 to check an address setting check box 130a, the address displayed in the address display 132a is set to the incoming notifying operation allowable list, and displayed in the incoming notifying operation allowable list display area 126 shown in FIG. 6(A). Furthermore, an address setting check box 130b corresponds to the address display 132b, and an address setting check box 130c corresponds to the address display 132c.

For example, in FIG. 6(B), the address setting check box 130a is checked, and therefore, an address "pppp@ecweb.ne.jp" of "Kakimoto xx" displayed in the address display 132a is displayed in the incoming notifying operation allowable list display area 126 shown in FIG. 6(A).

Returning to FIG. 6(A), the direct input key 124 is operated to thereby allow the user to input an address in the incoming notifying operation allowable list display area 126 by operating the key input device 24. For example, in a case that the user inputs "xxxx@sskkk.co.jp" as an address which is not registered, a character string "xxxx@sskkk.co.jp" is input with the key input device 24 to thereby display the "xxxx@sskkk.co.jp" in the incoming notifying operation allowable list display area 126. Furthermore, in the incoming notifying operation allowable list, only domain information (@sskkk.co.jp) may be set, and a setting result the same as that when the entire address including the set domain information is set may be obtained in the incoming notifying operation allowable list. Then, the detailed setting of the incoming notifying operation allowable list is stored in the RAM 28.

FIG. 7 is an illustrative view showing an example of a display of a GUI for making detailed setting at a time when e-mail is re-received belonging to the e-mail automatic reply function. Referring to FIG. 7, when a setting time key at a time when e-mail re-received 140 is operated, a time when an operation of e-mail re-receiving is made can be set. For example, in FIG. 7, "96 hours" is displayed on the setting time key at a time when e-mail re is re-received 140, and therefore, the setting time when e-mail is re-received is 96 hours. In addition, in this embodiment, the setting can be made every hour from 0 hour to 96 hours (4 days), but the setting may be made at an arbitrary time interval, such as every 30 minutes, every 24 hours or the like. In addition, the unit is changed from "hours" to "days" to make setting by days.

When an automatic reply ON/OFF key at a time when e-mail is re-received 142 is operated, whether or not an automatic reply is to be performed at a time when e-mail is re-received can be set. Then, when an incoming call notifying operation ON/OFF key at a time when e-mail is re-received 144 is operated, whether or not the mobile communication terminal 10 is caused to set an incoming call notifying operation at a time when e-mail is re-received can be set. Then, the setting of a time when the operation at a time when e-mail is re-received is performed and the setting of the operation at a time when e-mail is re-received are stored in the RAM 28.

FIG. 8 is an illustrative view showing an example of a display of a GUI for setting a text of an automatic reply mail belonging to the e-mail automatic reply function. Referring to FIG. 8, a setting area key 146 is operated to thereby make a text of a reply mail at a time of an e-mail automatic reply settable. Furthermore, when the user operates the key input device 24 to input a character string in order to set the text of the reply mail, the character string input to the setting area key 146 is displayed. Then, the text of the set automatic reply mail is stored in the RAM 28.

The user can perform a detailed setting as to GUIs of an e-mail automatic reply belonging to the e-mail automatic reply function shown in FIG. 3-FIG. 8. Here, each example of the display of the GUI is one example, and therefore, if setting similar to this embodiment can be performed, other GUIs may be available.

Successively, a domain analysis, a character code analysis and a header time difference analysis are explained. FIG. 9 is an illustrative view showing a part of header information of a certain e-mail message received by the mobile communication terminal 10. Referring to FIG. 9, in the header information, address information of a sender of an e-mail message dm, character code information set in a mailer to be used by a sender of an e-mail message co, receiving end time information including a date and time when the mobile communication terminal 10 receives an e-mail message and time difference information between it and the universal time rhd and sending end time information including a date and time when a sender of an e-mail message sends and time difference information between it and the universal time thd.

First, as to the domain analysis, a top level domain (TLD: Top Level Domain) of the address included in the address information dm is read. In the address information dm (Return-Path: <xxxx@sskkk.co.jp>), "jp" is a top level domain. The "jp" is called a country-code top-level domain (ccTLD: Country Code TLD), and indicates Japan. This shows that the address "xxxx@sskkk.co.jp" is an address acquired by a person belonging to Japan, and the received e-mail message is more likely to be sent from Japan. Thus, from the TLD of the address information dm and the area information set to the mobile communication terminal 10, a time difference between an e-mail sending region (sending region) and an e-mail receiving region (receiving region) can be evaluated.

More specifically, a domain time difference table shown in FIG. 10 is utilized. In the domain time difference table, at the left side of each line, ccTLD is set, and at the upper end of each column, a region settable by a roaming function is set. Then, with respect to the line to which the read ccTLD is set, data in the cell corresponding to the region set at the upper side of each column is referred to thereby obtain the time difference between the e-mail sending region and the e-mail receiving region. For example, assuming that "America" is set by a roaming function, and the ccTLD read from the received e-mail message is "jp", data set in the cell as an intersection of the column of America and the line to which jp is set is read. Then, the read data is "14:00", and thus, the time difference between the e-mail sending region and the e-mail receiving region is 14 hours.

That is, in the domain analysis, the time difference between the e-mail sending region and the e-mail receiving region can be obtained from the region set by a roaming function and the ccTLD read from the address of the received e-mail. Here, if the TLD is not the ccTLD ("com", etc.), the time difference may be set to 0 hours.

Returning to FIG. 9, in the character code analysis, the character code information included in the character code information co is read. As to the character code information co (Content-Type: text/plain; charset="iso-2022-jp"), "iso-2022-jp" is character code information. The "iso-2022-jp" is character encoding scheme for Japanese. This shows that the received e-mail message is more likely to be sent from Japan. Thus, from the character code information included in the character code information co and the region information set to the mobile communication terminal 10, a time difference between the e-mail sending region and the e-mail receiving region can be obtained.

Figures 11, 15:
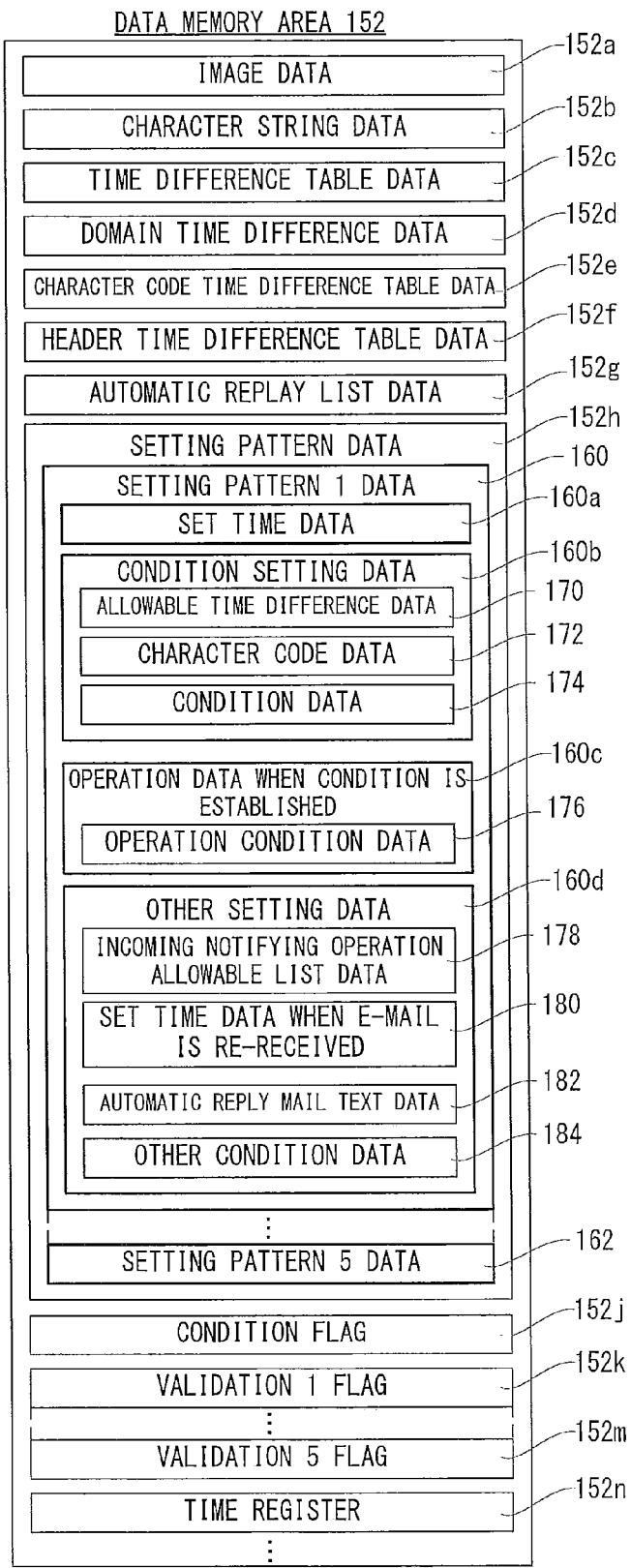
FIG. 11 is an illustrative view showing one example of a character code time difference table stored in the RAM shown in FIG. 1.
FIG. 15 is an illustrative view showing contents of a data memory area shown in FIG. 14.

More specifically, the character code time difference table shown in FIG. 11 is utilized. In the character code time difference table, at the left side of each line, a language indicated by the character code information is set, and at the upper end of each column, a region settable by a roaming function is set. Then, as to the line to which the read character code information is set, data in the cell corresponding to the region set to the upper end of each column is referred to thereby obtain a time difference between the e-mail sending region and the e-mail receiving region. For example, assuming that "America" is set by the roaming function, and the character code information read from the received e-mail message is "iso-2022-jp", the language indicated by "iso-2022-jp" is Japanese, and thus, data set in the cell as an intersection of the column of America and the line to which Japanese is set is read. Thus, the read data is "14:00". That is, the time difference between the e-mail sending region and the e-mail receiving region is 14 hours.

That is, as to the character code analysis, from the region set by the roaming function and the character code information read from the address of the received e-mail message, the time difference between the e-mail sending region and the e-mail receiving region can be obtained.

Returning to FIG. 9, as to the header time difference analysis, the time difference information included in the receiving end time information rhd and the sending end time information thd are read. First, "−0500" of the receiving end time information rhd (Fri, 30 Nov. 2007 1:54-0500) indicates the time difference information. In the receiving end time information rhd, "−0500" indicates that an e-mail message is received at a region −5 hours from the universal time (Washington, D.C. in U.S., for example). On the other hand, "+0900" of the sending end time information thd (Date: Fri, 30 Nov. 2007 15:54:13 +0900) indicates the time difference information. In the sending end time information thd, "+0900" indicates that an e-mail message is sent from a region +9 hours from the universal time (Japan, for example). Thus, from the time difference information of the receiving end time information rhd and the time difference information of the sending end time information thd, the time difference between the e-mail sending region and the e-mail receiving region can be obtained.

More specifically, a header time difference table shown in FIG. 12 is utilized. In the header time difference table, at the left side of each line, the time difference information included in the receiving end time information rhd is set, and at the upper end of each column, the time difference information included in the sending end time information thd is set. Then, with respect to the line to which the time difference information read from the receiving end time information rhd is set, the data in the cell corresponding to the region set at the upper side of each column is referred to thereby obtain the time difference between the e-mail sending region and the e-mail receiving region. For example, assuming that the time difference information read from the receiving end time information rhd is "−0500", and the time difference information read from the sending end time information thd is "+0900", data set in the cell as an intersection of the line to which −0500 is set and the column to which +0900 is set is read. Then, the read data is "14:00", and this shows that the time difference between the e-mail sending region and the e-mail receiving region is 14 hours.

That is, as to the header time difference analysis, from the time difference information read from the receiving end time information rhd and the sending end time information thd, the time difference between the e-mail sending region and the e-mail receiving region can be obtained. In this embodiment, by using the time difference information of the receiving end time information rhd and the time difference information of the sending end time information thd, the header time difference analysis is performed. However, it is needless to say that by using the region set by the roaming function and the time difference information of the sending end time information thd, the time difference between the e-mail sending region and the e-mail receiving region may be obtained.

Successively, an operation at a time of when an e-mail message is re-received is explained. The operation at a time when e-mail is re-received is to store a date and time and a sending address when an e-mail automatic reply is performed in the automatic reply list in order to determine whether or not an address of the received e-mail message is re-received.

FIG. 13 is an illustrative view showing one example of an automatic reply list. Referring to FIG. 13, in the column of the date and time, the date and time information when an automatic reply is performed is stored. Here, in the line of the date and time, the time to be displayed by the time displaying function on the LCD monitor 22 is stored. For example, when the time displayed on the LCD monitor 22 is Nov. 23, 2007, 3:50, if an automatic reply is performed, "2007/11/23/3:50" is stored. Next, in the column of the address, an address of the partner with whom an automatic reply is performed is stored. For example, in a case that an automatic reply is performed in response to an e-mail message including address information of "xxxx@sskkk.co.jp", "xxxx@sskkk.co.jp" is stored. Then, in a case that an operation when an e-mail message is re-received is set, it is determined whether or not the address of the received e-mail message matches the address stored in the automatic reply list. If they match, whether or not the re-receiving is within the time period set by the user is determined. Thus, if the addresses match, and the re-receiving is within the set time period, the mobile communication terminal 10 performs an operation decided in advance. Furthermore, the automatic reply list is stored in the RAM 28.

FIG. 14 is an illustrative view showing a memory map of the RAM 28. Referring to FIG. 14, the memory map of the RAM 28 includes a program memory area 150 and a data memory area 152. A part of the program and data are read from the flash memory 26 entirely at a time, or partially and sequentially so as to be stored into the RAM 28, and undergo processing by the CPU 20, etc. It should be noted that only a part of the memory map is shown in FIG. 14, but other programs and data that are necessary for the processing are also stored.

The program memory area 150 stores a program for operating the mobile communication terminal 10. The program for operating the mobile communication terminal 10 is made up of an e-mail automatic reply setting processing program 150a, a processing program at a time when e-mail is received 150b, etc. The e-mail automatic reply setting processing program 150a is a program for making detailed setting from the setting pattern 1 to the setting pattern 5 and setting the valid/invalid state from the setting pattern 1 to the setting pattern 5 by displaying the GUIs for setting the e-mail automatic reply function shown in FIG. 3-FIG. 8 on the LCD monitor 22. For example, when the setting pattern 1 key 60a shown in FIG. 3 is operated, the GUI for making the detailed setting of the setting pattern 1 shown in FIG. 4 is displayed on the LCD monitor 22. In addition, when the ON/OFF key 62a is operated, the valid/invalid state of the setting pattern 1 is settable.

The processing program at a time when e-mail is received 150b is a program for determining an operation in a case that the mobile communication terminal 10 receives an e-mail message. In this embodiment, in a case that an e-mail message is received, any one of four kinds of operations, such as an operation of causing the mobile communication terminal 10 to perform an incoming call notifying operation without execution of the automatic reply, an operation of causing the mobile communication terminal 10 to perform an incoming call notifying operation and execute an automatic reply, an operation of causing the mobile communication terminal 10 not to perform an incoming call notifying operation without execution of an automatic reply, and an operation of causing the mobile communication terminal 10 not to perform an incoming call notifying operation and to execute an automatic reply is determined to be executed.

Although illustration is omitted, the program for operating the mobile communication terminal 10 includes a program for making communications, a program for controlling data communications with the network server, a program for controlling a region setting by the roaming function, and a program for controlling a time displaying function, etc.

FIG. 15 is an illustrative view showing contents of the data memory area 152 shown in FIG. 14. Referring to FIG. 15, in the data memory area 152, image data 152a, character string data 152b, time difference table data 152c, domain time difference table data 152d, character code time difference table data 152e, header time difference table data 152f, automatic reply list data 152g and setting pattern data 152h are stored. Furthermore, a condition flag 152j, a validation 1 flag 152k, a validation 5 flag 152m and a time register 152n are provided.

The image data 152a is image data to be displayed on the LCD monitor 22 of the mobile communication terminal 10. Furthermore, the image to be displayed on the LCD monitor 22 is images to be displayed during a stand-by of the mobile communication terminal 10 and images to be utilized for the GUIs belonging to the e-mail automatic reply function.

The character string data 152b is character string data to be displayed on the LCD monitor 22 of the mobile communication terminal 10. The character string to be displayed on the LCD monitor 22 is a numeral of a current time displayed on the LCD monitor 22, alphabetic characters, kanji characters, hiragana characters, etc. that are displayed on the GUI.

The time difference table data 152c is data to be used when a foreign time is displayed on the LCD monitor 22 in a foreign-time-displaying mode belonging to the time displaying function. For example, in a case that the time difference between the time read from the RTC 30 to which Japanese time is set and the time of the region set by the roaming function is obtained, a time difference is read from the time difference table data to thereby obtain the time of the region set by the roaming function.

The domain time difference table data 152d is data set to each cell of the domain time difference table shown in FIG. 10. The character code time difference table data 152e is data set to each cell of the character code time difference table shown in FIG. 11. The header time difference table data 152f is data set to each cell of the header time difference table shown in FIG. 12. The automatic reply list data 152g is data set to each cell of the automatic reply list shown in FIG. 13.

The setting pattern data 152h is made up of setting pattern 1 data 160 to setting pattern 5 data 162 which are input by the GUIs of the e-mail automatic reply function shown in FIG. 4-FIG. 8. Furthermore, although not illustrated in the drawings, there also are setting pattern 2 data, setting pattern 3 data and setting pattern 4 data. In addition, the setting pattern 1 data 160 is made up of set time data 160a, condition setting data 160b, operation data at a time when a condition is established 160c and other setting data 160d. Additionally, the data structure of the setting pattern 2 data to the setting pattern 5 data 162 are the same as that of the setting pattern 1 data 160, and therefore, detailed explanation is omitted.

In the set time data 160a, a time set to the set time key 70 (see FIG. 4) is stored. The condition setting data 160b is further made up of allowable time difference data 170, character code data 172 and condition data 174. In the allowable time difference data 170, a time set to the allowable time difference key 72 (see FIG. 4) is stored. In the character code data 172, setting of the character code information to be analyzed set in FIG. 5 is stored. Returning to FIG. 15, in the condition data 174, the statuses of the domain analysis ON/OFF key 74, the character code analysis ON/OFF key 76 and the header time difference analysis ON/OFF key 80 shown in FIG. 4, and the states of the incoming call notifying operation ON/OFF key at a time when the character code information is unknown 112 shown in FIG. 5 are stored.

That is, referring to FIG. 4-FIG. 5, in the condition data 174, the domain analysis, the character code analysis and the header time difference analysis are stored in an on-(valid) state, and the incoming call notifying operation when the character code information is unknown is stored in an off-(invalid) state.

Returning to FIG. 15, the operation data at a time when a condition is established 160c is made up of operation condition data 176. In the operation condition data 176, the states of the automatic reply ON/OFF key 82 and the incoming call notifying operation ON/OFF key 84 shown in FIG. 4 are stored. That is, referring to FIG. 4, in the operation condition data 176, the automatic reply and the incoming call notifying operation are stored in an on-(valid) state if the condition set in the condition setting data 160b is satisfied.

Returning to FIG. 15, the other setting data 160d is further made up of incoming notifying operation allowable list data 178, set time data at a time when e-mail is re-received 180, automatic reply mail text data 182 and other condition data 184. In the incoming notifying operation allowable list data 178, an address to be displayed in the incoming notifying operation allowable list display area 126 (see FIG. 6(A)) is stored. In the set time data at a time when e-mail is re-received 180, a time to be set in the setting time key at a time when e-mail is re-received 140 (see FIG. 7) is stored. In the automatic reply mail text data 182, a text of the automatic reply mail to be set to the creation area key 146 (see FIG. 8) is stored.

In the other condition data 184, the states of the incoming notifying operation allowable list ON/OFF key 86 and the e-mail re-receiving ON/OFF key 90 shown in FIG. 4, the state of the automatic reply ON/OFF key 120 shown in FIG. 6, and the states of the automatic reply ON/OFF key at a time when e-mail is re-received 142 and the incoming call notifying operation ON/OFF key at a time when e-mail is re-received 144 shown in FIG. 7 are stored. That is, referring to FIG. 4, FIG. 6(A), FIG. 6(B) and FIG. 7, in other condition data 184, the setting of the incoming notifying operation allowable list, the setting at a time when e-mail is re-received, the automatic reply when the incoming notifying operation allowable list is set, and the automatic reply and an incoming call notifying operation at a time when e-mail message is re-received are stored in the-on (valid) state.

The condition flag 152*j* is a flag for determining whether or not the condition set by the user is satisfied in a case that the above-described processing program at a time when e-mail is received 150*b* is executed. For example, the condition flag 152*j* is made up of one bit register. When the condition flag 152*j* is established (ON), a data value "1" is set to the register, and when the condition flag 152*j* is unestablished (OFF), a data value "0" is set to the register. Furthermore, the initial setting of the go-off flag 82*f* is set to an off state.

The validation 1 flag 152*k* corresponds to the ON/OFF key 62*a* shown in FIG. 4, and is a flag for determining whether an on-state or not. For example, the validation 1 flag 152*k* is made up of one bit register. When the validation 1 flag 152*k* is established (ON), a data value "1" is set to the register, and when the validation 1 flag 152*k* is unestablished (OFF), a data value "0" is set to the register. Furthermore, the initial setting of the validation 1 flag 152*k* is set to an off state. Moreover, the validation 5 flag 152*m* corresponds to the ON/OFF key 62*e* shown in FIG. 4, and is a flag for determining whether an on-state or not. Additionally, the detailed operation is similar to that of the validation 1 flag 152*k*, and is thus omitted. Although not illustrated, there are a validation 2 flag, a validation 3 flag and a validation 4 flag as well.

The time register 152*n* is a register for temporarily storing time data generated by the RTC 30. For example, when the RTC 30 generates a current time of Japan, if the time generated by the RTC 30 is Nov. 10, 2007, 14:20, "2007/11/10/14: 20" is stored in the time register 152*n*. In addition, if the time displaying function is in the foreign-time-displaying mode, a time difference read from the time difference table data 152*c* is calculated with respect to the data of the time read from the RTC 30 and stored.

Although illustration is omitted, in the data memory area 82, data of the address book, data obtained by a data communication operation with the network 100, and other data are stored, and other counters and flags which are necessary for operations of the mobile communication terminal 10 are also provided.

Figure 16:
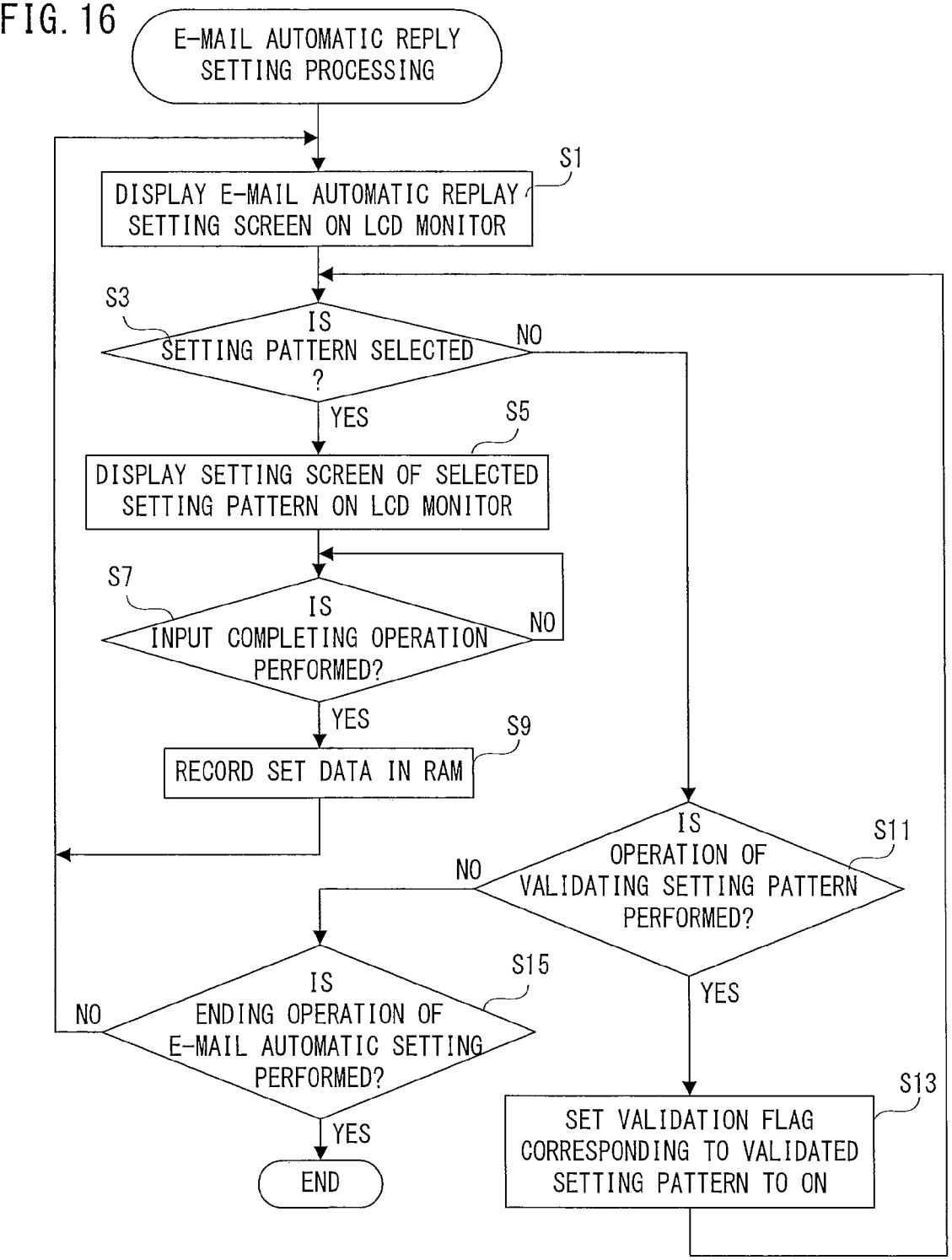
FIG. 16 is a flowchart showing e-mail automatic reply setting processing to be executed by a CPU of the mobile communication terminal shown in FIG. 1.

More specifically, the CPU 20 executes tasks including e-mail automatic reply setting processing shown in FIG. 16 and processing at a time when e-mail is received shown in FIG. 17-FIG. 21 under controls of the multitasking OS including μITRON, Symbian, etc.

FIG. 16 is a flowchart showing e-mail automatic reply setting processing. Referring to FIG. 16, in a step S1, an e-mail automatic reply setting screen is displayed on the LCD monitor 22. That is, the GUI for making setting of the e-mail automatic reply function shown in FIG. 3 is displayed on the LCD monitor 22. In a next step S3, it is determined whether or not a setting pattern is selected. That is, it is determined whether or not any one of the setting pattern 1 key 60*a* to the setting pattern 5 key 60*e* (see FIG. 3) is operated. If "YES" is determined in the step S3, that is, if the setting pattern 1 key 60*a* is operated, a setting screen of the selected setting pattern is displayed on the LCD monitor 22 in a step S5. That is, the GUI for making detailed setting of the setting pattern 1 shown in FIG. 4, etc. is displayed on the LCD monitor 22. In a next step S7, it is determined whether or not an input completing operation is performed. For example, it is determined whether or not an input completing key not shown which is provided to the key input device 24 is operated. If "NO" in the step S7, that is, if input completing key not shown which is provided to the key input device 24 is not operated, the processing in the step S7 is repeated. On the other hand, if "YES" is determined in the step S7, the set data is stored in the RAM 28 in a step S9. That is, data of a time when the e-mail automatic reply function is operated, a setting of an automatic reply mail text, etc. are stored in the RAM 28, and the process returns to the step S1.

If "NO" in the step S3 here, that is, if another is made without the setting pattern 1 key 60*a* being operated, it is determined whether or not an operation for validating the setting pattern is determined in a step S11. That is, it is determined whether or not any one of the ON/OFF keys 62*a*-62*e* (see FIG. 3) is operated. If "YES" is determined in the step S11, that is, if the ON/OFF key 62*a* is operated, the validation flag corresponding to the validated (turned-on) setting pattern is in an on-state in a step S13. That is, the setting pattern 1 corresponding to the ON/OFF key 62*a* is validated, so that the validation 1 flag 152*k* is turned on, and the process returns to the step S3.

On the other hand, if "NO" in the step S11, that is, if any one of the ON/OFF keys 62*a*-62*e* is not operated, it is determined whether or not an ending operation of the setting of the e-mail automatic reply is performed in a step S15. For example, it is determined whether or not the operation completing key not shown which is provided to the key input device 24 is operated. If "NO" in the step S15, that is, if the operation completing key is not operated, the process returns to the step S1. On the other hand, if "YES" is determined in the step S15, the e-mail automatic reply setting processing is ended.

Next, the processing at a time when e-mail is received shown in FIG. 17-FIG. 21 is explained. Explanations are separately made as to a case that the domain analysis, the character code analysis and the header time difference analysis are set as conditions, a case that the incoming notifying operation allowable list is set, and a case that an e-mail re-receiving is set.

Figure 17:
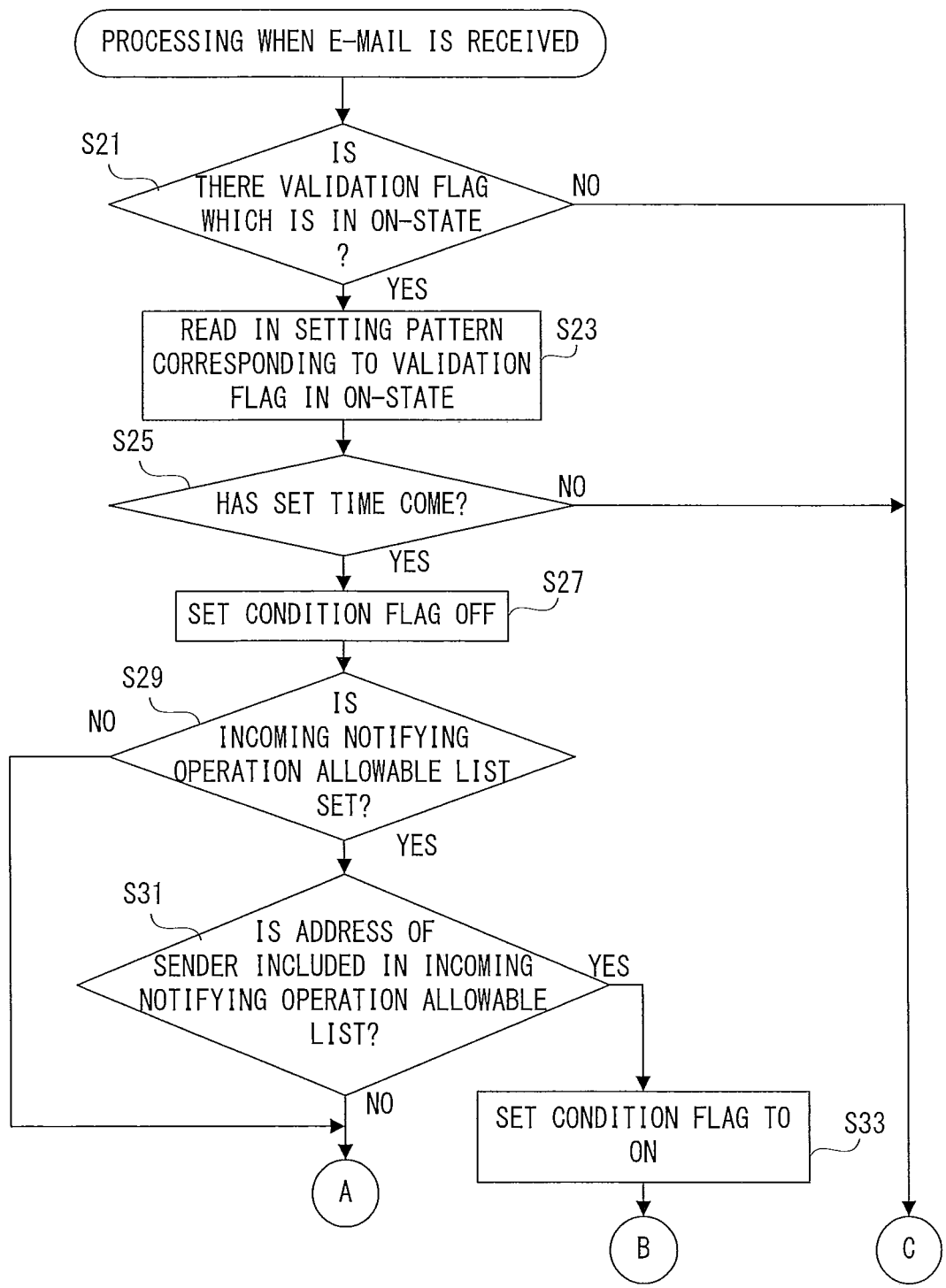
FIG. 17 is a flowchart showing a part of processing at a time when e-mail is received to be executed by the CPU of the mobile communication terminal shown in FIG. 1.

First, an explanation is made as to a case that the domain analysis, the character code analysis and the header time difference analysis are set as conditions. FIG. 17-FIG. 21 is a flowchart showing the processing at a time when e-mail is received. Referring to FIG. 17, in a step S21, it is determined whether or not there is a validation flag which is in an on-state. That is, it is determined whether or not at least one or more of the validation 1 flag 152*k* to the validation 5 flag 152*m* shown in FIG. 15 is turned on. If "YES" is determined in the step S21, that is, if the validation 1 flag 152*k* is turned on, the setting pattern corresponding to the validation flag in the on-state is read in a step S23. That is, the setting of the setting pattern 1 is read.

In a following step S25, it is determined whether or not the set time has come. That is, it is determined whether or not the time displayed on the LCD monitor 22, etc. is the time set to the set time key 70 (see FIG. 4) read from the set time data 160*a* (see FIG. 15). If "YES" is determined in the step S25, that is, if the time displayed on the LCD monitor 22, etc. is within the set time, the condition flag 152*j* is set to off in a step S27. That is, the condition flag 152*j* is initialized.

Figure 21:
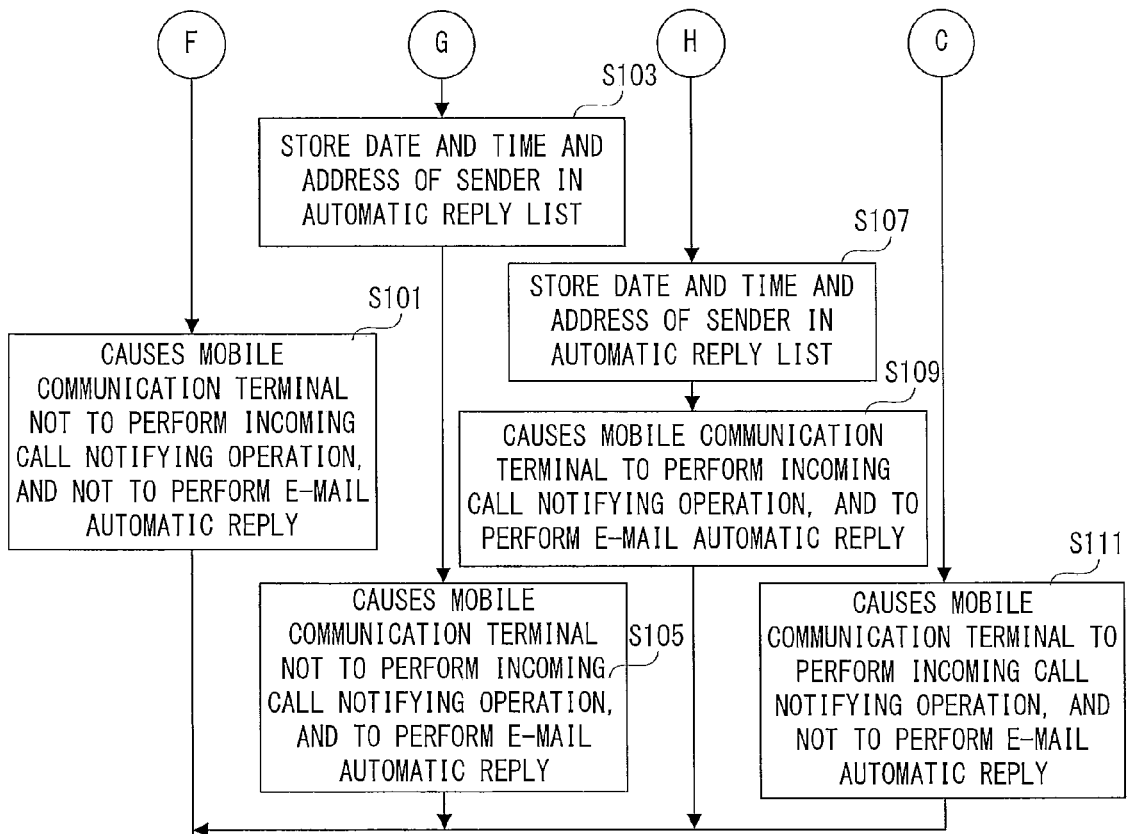
FIG. 21 is a flowchart being sequel to FIG. 20 showing another part of the processing at a time when e-mail is received which is to be executed by the CPU of the mobile communication terminal shown in FIG. 1.
Figure 20:
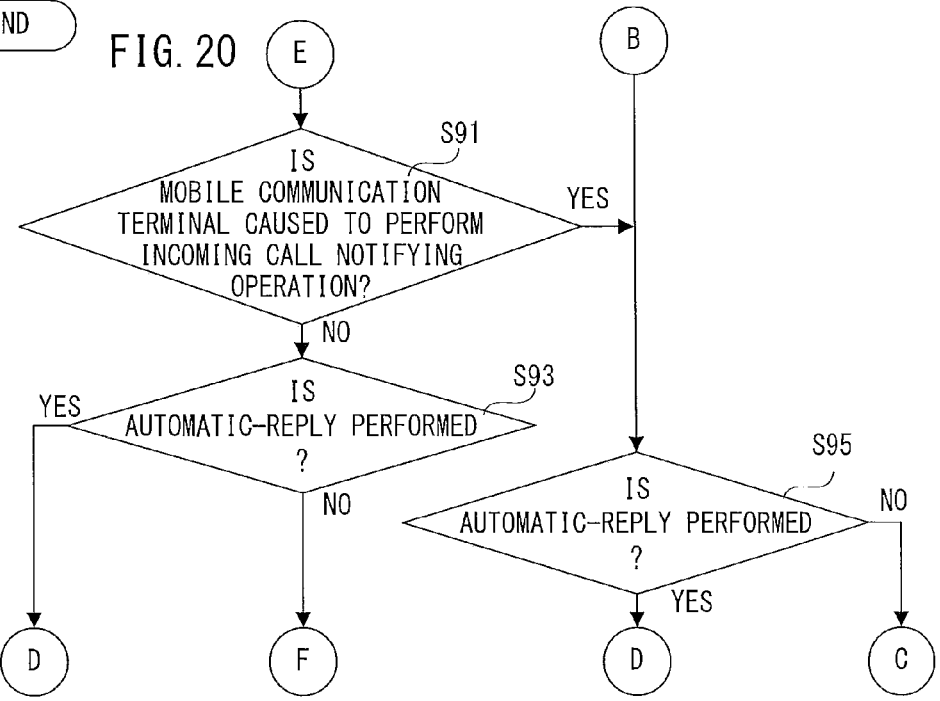
FIG. 20 is a flowchart being sequel to FIG. 19 showing a further part of the processing at a time when e-mail is received which is to be executed by the CPU of the mobile communication terminal shown in FIG. 1.

Here, if "NO" in the step S21 or step S25, that is, if the e-mail automatic reply function is not executed, the mobile communication terminal 10 is caused to perform a incoming call notifying operation, and not to perform an e-mail automatic reply in a step S111 in FIG. 21. That is, the mobile communication terminal 10 notifies the user of normal reception of an e-mail message as in normal times, and ends the processing at a time when e-mail is received.

Returning to FIG. 17, if the processing in the step S27 is completed, it is determined whether or not the incoming notifying operation allowable list is set in a step S29. That is, the state of the incoming notifying operation allowable list ON/OFF key 86 (see FIG. 4) is read from the other condition data 184 (see FIG. 15) to determine whether an on-state or not. As to the state set to the incoming notifying operation allowable list is described later, and thus, "NO" is determined in the step S29.

Figure 18:
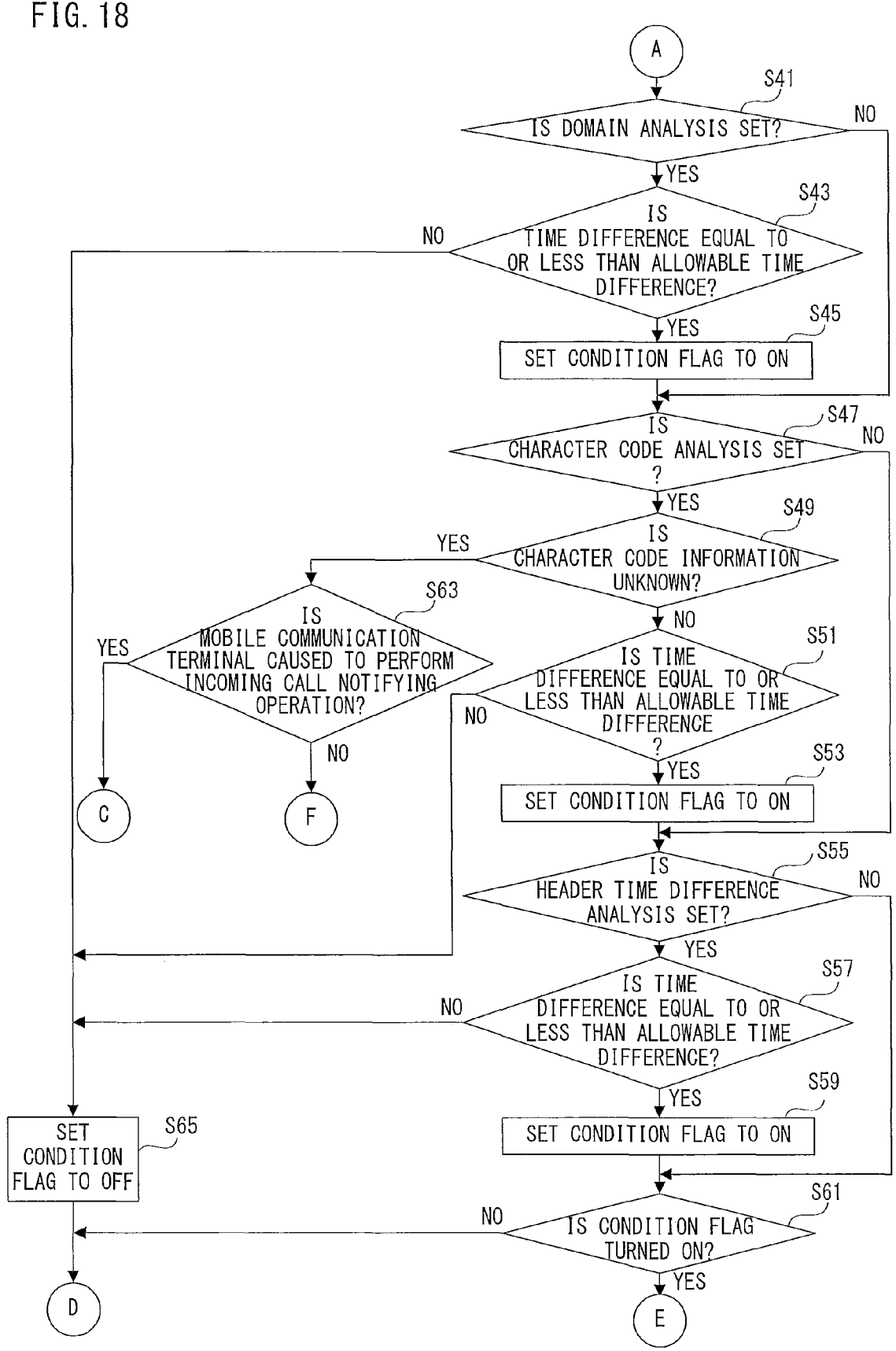
FIG. 18 is a flowchart being sequel to FIG. 17 showing another part of the processing at a time when e-mail is received which is to be executed by the CPU of the mobile communication terminal shown in FIG. 1.

Referring to FIG. 18, in a step S41, it is determined whether or not the domain analysis is set. That is, the state of the domain analysis ON/OFF key 74 (see FIG. 4) is read from the condition data 174 (see FIG. 15) to determine whether an on-state or not. The explanation here is as to a case that the domain analysis is set, and thus, "YES" is determined in the step S41, and it is determined whether or not to be equal to or less than the allowable time difference in a step S43. That is, it is determined whether or not the time difference obtained from the TLD of the received e-mail message, the region set by the roaming function and the domain time difference table (see FIG. 10) is equal to or less than the allowable time difference set from the allowable time difference data 170 (see FIG. 15) to the allowable time difference key 72 (see FIG. 4). If "YES" is determined in the step S43, that is, if the obtained time difference is equal to or less than the allowable time difference, the condition flag is turned on in a step S45.

In a next step S47, it is determined whether or not the character code analysis is set. That is, the state of the character code analysis key 76 (see FIG. 4) is read from the condition data 174 (see FIG. 15) to determine whether an on-state or not. The explanation in a case that the character code analysis is set is made here, and thus, "YES" is determined in the step S47, and it is determined whether or not the character code information is unknown in a step S49. That is, it is determined whether or not the character code information of the received e-mail message does not match any one of the character code information stored in the mobile communication terminal 10. If "NO" in the step S49, that is, if the character code information of the received e-mail message is not unknown, it is determined whether or not to be equal to or less than the allowable time difference in a step S51. That is, it is determined whether or not the time difference obtained from the character code information of the received e-mail message, the region set by the roaming function and the character code time difference table (see FIG. 11) is equal to or less than the allowable time difference set from the allowable time difference data 170 (see FIG. 15) to the allowable time difference key 72 (see FIG. 4). That is, if the obtained time difference is equal to or less than the allowable time difference, the condition flag is turned on in a step S53.

In a next step S55, it is determined whether or not the header time difference analysis is set. That is, the state of the header time difference analysis ON/OFF key 80 (see FIG. 4) is read from the condition data 174 to determine whether an on-state or not. Here, an explanation in a case that header time difference analysis is set is made, and thus, "YES" is determined in the step S55, and it is determined whether or not to be within the allowable time difference in a step S57. That is, it is determined whether or not the time difference obtained from the time difference of the sending end of the received e-mail message, the time difference of the receiving end thereof and the header time difference table (see FIG. 12) is equal to or less than the allowable time difference set from the allowable time difference data 170 (see FIG. 15) to the allowable time difference key 72 (see FIG. 4). If "YES" is determined in the step S57, that is, if the obtained time difference is equal to or less than the allowable time difference, the condition flag is set to an on-state in a step S59.

In a next step S61, it is determined whether or not the condition flag 152*j* is turned on. That is, it is determined whether or not the domain analysis, the character code analysis or the header time difference analysis is performed. The condition flag 152*j* is turned on here, and "YES" is determined in the step S61, and thus, in a step S91 in FIG. 20, it is determined whether or not the mobile communication terminal 10 is caused to perform an incoming call notifying operation. That is, the state of the incoming call notifying operation ON/OFF key 84 (see FIG. 4) is read from the operation condition data 176 (see FIG. 15) to determine whether an on-state or not. If "YES" is determined in the step S91, that is, if the incoming call notifying operation ON/OFF key 84 is in an on-state, it is determined whether or not the automatic reply is performed in a step S95. That is, the state of the automatic reply ON/OFF key 84 (see FIG. 4) is read from the operation condition data 176 (see FIG. 15) to thereby determine whether or not the automatic reply ON/OFF key 82 (see FIG. 4) is in an on-state. If "NO" in the step S95, that is, if the automatic reply ON/OFF key 82 is in an off-state, the process proceeds to the step S111 in FIG. 21.

If "NO" in the step S91 here, that is, if the incoming call notifying operation ON/OFF key 84 is in an off-state, an e-mail automatic reply is to be performed in a step S93. That is, similar to the processing in the step S95, it is determined whether or not the automatic reply ON/OFF key 82 is in an on-state. If "NO" in the step S93, that is, if the automatic reply ON/OFF key 82 is in an off-state, the mobile communication terminal 10 is caused not to perform an incoming call notifying operation, and not to perform an e-mail automatic reply in a step S101 shown in FIG. 21. That is, the received e-mail message is an e-mail message from the party to which a reply is not required to be sent for the user, for example, an automatic delivered e-mail message from an e-mail automatic delivering service to which the user subscribes, and therefore, the content of the received e-mail message is not required to be confirmed, and an e-mail message is not required to be sent back to the source of the automatic delivering service. Then, if the processing in the step S101 is ended, the processing at a time when e-mail is received is ended.

Figure 19:
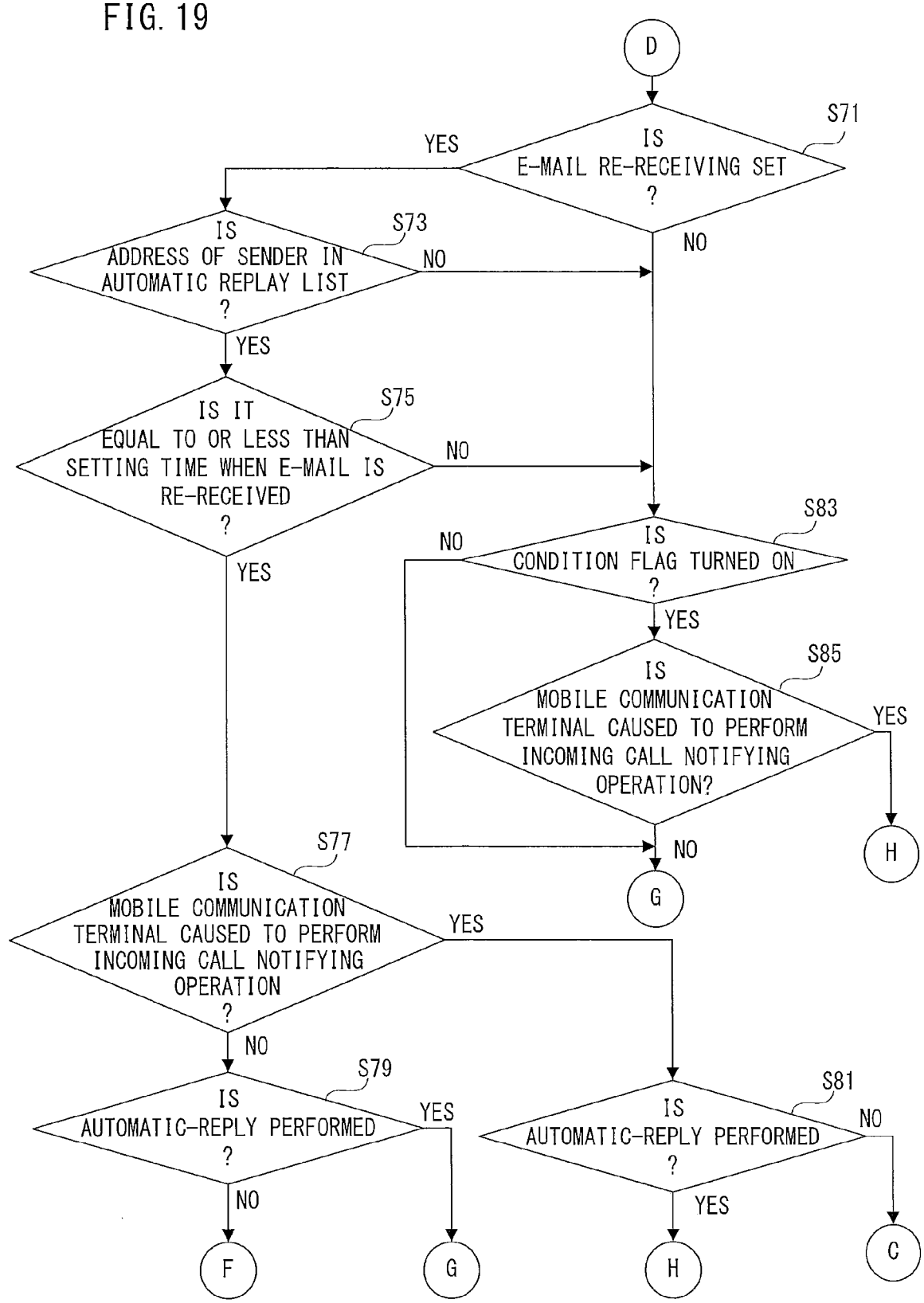
FIG. 19 is a flowchart being sequel to FIG. 18 showing a still another part of the processing at a time when e-mail is received which is to be executed by the CPU of the mobile communication terminal shown in FIG. 1.

If "YES" in the step S93 or the step S95, that is, if the automatic reply ON/OFF key 82 is in an on-state, it is determined whether or not e-mail re-receiving is set in a step S71 shown in FIG. 19. The case that an e-mail re-receiving is set is described later, and therefore, "NO" is determined here. In a next step S83, it is determined whether or not the condition flag 152*j* is turned on. That is, it is determined whether or not the condition set to the setting pattern read in the step S23 is satisfied. Here, the domain analysis, the character code analysis and the header time difference analysis are performed, and thus, "YES" is determined in the step S83, and it is determined whether or not the mobile communication terminal 10 is caused to perform an incoming call notifying operation in a step S85. That is, similar to the processing in the step S91, the state of the incoming call notifying operation ON/OFF key 84 is read to thereby determine whether an on-state or not.

If "NO" in the step S85, that is, if the incoming call notifying operation ON/OFF key 84 is in an off-state, the current date and time and the address of the sender are stored in the automatic reply list in a step S103 shown in FIG. 21. That is, the value set to the time register 152n and the address of the sender included in the header of the received e-mail message are stored in the automatic reply list. For example, if the value set to the time register 152n is "2007/11/23/3:50", and the address of the sender included in the header of the received e-mail message is "xxxx@sskkk.co.jp", "2007/11/23/3:50" is stored in the cell included in the column of the date and time of the automatic reply list, and "xxxx@sskkk.co.jp" is stored in the cell included in the column of the address. In a following step S105, the mobile communication terminal 10 is caused not to perform an incoming call notifying operation, and to perform an e-mail automatic reply. That is, the user is in a condition in which he or she cannot send a reply soon (during sleeping, etc.), and thus, an e-mail to which a text stored in the automatic reply mail text data 182 is set is sent as an automatic reply to the sender who is regarded as being unknown to the current condition of the user Then, if the processing in the step S105 is completed, the processing at a time when e-mail is received is ended.

Furthermore, if "YES" is determined in the step S85, that is, if the incoming call notifying operation ON/OFF key 84 is in an on-state, the date and time and the address of the sender are stored in the automatic reply list in a step S107 in FIG. 21. That is, similar to the processing in the step S103, the value set to the time register 152n and the address of the sender included in the header of the received e-mail message are stored in the automatic reply list. In a next step S109, the mobile communication terminal 10 is caused to perform an incoming call notifying operation, and perform an e-mail automatic reply. That is, the mobile communication terminal 10 notifies the user that an e-mail message is received, and an automatic reply is performed. Then, after completion of the processing in the step S109, the processing at a time when e-mail is received is ended.

Thus, in a case that the domain analysis, the character code analysis and the header time difference analysis are set as conditions, if the set condition is satisfied, the mobile communication terminal 10 performs the operation set by the user. Furthermore, in a case that the time difference with the region where the received e-mail message is sent is equal to or less than the set time difference, the mobile communication terminal 10 notifies the user that an e-mail message is received by the incoming call notifying operation. For example, assuming that the user stays in Washington, D.C. in Unites States, and the set time difference is 0:00-5:00, if the mobile communication terminal 10 receives an e-mail message sent from all over the United States or Canada, it notifies the user that the e-mail message is received by the incoming call notifying operation, but it does not notify the user of an e-mail message sent from Japan, etc.

Here, processing when the domain analysis, the character code analysis, and the header time difference analysis are not set as conditions, and processing when they do not satisfy the set condition are also explained. First, if the domain analysis, the character code analysis and the header time difference analysis are not set as conditions, "NO" is determined in the step S41, the step S47 and the step S55, and "NO" is determined in the step S61 shown in FIG. 18, and then, the process proceeds to the step S71 in FIG. 19. Furthermore, if the set condition is not satisfied, "NO" is determined in the step S43, the step S49 or the step S57. That is, the obtained time difference is larger than the allowable time difference, the condition flag 152j is turned off in the step S65, and then, the process proceeds to the step S71 shown in FIG. 19.

Then, in the step S71, it is determined whether or not e-mail re-receiving is set. A case that e-mail re-receiving is set is described later, and "NO" is determined in the step S71, and thus, in the next step S83, it is determined whether or not the condition flag 152j is "NO". Here, the domain analysis, the character code analysis and the header time difference analysis are not set as conditions, or they do not satisfy the set condition, and therefore, the condition flag 152j (FIG. 15) is set to off, and thus, "NO" is determined in the step S83, and the process proceeds to the step S103 shown in FIG. 21. That is, if the domain analysis, the character code analysis and the header time difference analysis are not set as conditions, or the set condition is not satisfied, the mobile communication terminal 10 performs an automatic reply without execution of an incoming call notifying operation.

An explanation is made on a case that "YES" is determined in the step S49, that is, on a case that the character code information is unknown. If "YES" is determined in the step S49, it is determined whether or not the mobile communication terminal 10 is caused to perform an incoming call notifying operation in the step S63. That is, the status of the incoming call notifying operation ON/OFF key at a time when the character code information is unknown 112 (see FIG. 5) is read from the condition data 174 (see FIG. 15), and it is determined whether or not the incoming call notifying operation ON/OFF key at a time when the character code information is unknown 112 is in an on-state. If "YES" is determined in the step S63, that is, if the incoming call notifying operation ON/OFF key when the character code information is unknown 112 is turned on, the process proceeds to a step S111 shown in FIG. 21. On the other hand, if "NO" in the step S63, that is, the incoming call notifying operation ON/OFF key when the character code information is unknown 112 is turned off, the process proceeds to the step S101 shown in FIG. 21.

That is, if the character code information is unknown, the language used by the sender is different from the language used by the user, and the "sender" may not read the text of the automatic reply mail, and therefore, the automatic reply is not performed. Here, the automatic reply may be set so as to perform an automatic reply even if the character code information is unknown.

Succeedingly, an explanation is made on a case that the incoming notifying operation allowable list is set. The processing before the steps S21-S27 are the same as that of a case that the domain analysis, the character code analysis and the header time difference analysis are set as conditions, and therefore, detailed explanation is omitted.

Referring to FIG. 17, in the step S29, it is determined whether or not the incoming notifying operation allowable list is set. Here, the incoming notifying operation allowable list is set, and thus, "YES" is determined in the step S29. In the step S31, it is determined whether or not the address of the sender is included in the incoming notifying operation allowable list. That is, it is determined whether or not the address of the sender included in the header of the received e-mail message is included in the incoming notifying operation allowable list data 178 (see FIG. 15). If "NO" in the step S31, that is, if the address of the address is not included in the incoming notifying operation allowable list data 178, the processing after the step S41 in FIG. 18 is performed. On the other hand, if "YES" is determined in the step S31, that is, if the address of the sender is included in the incoming notifying operation allowable list data 178, the condition flag is turned on in the step S33, and it is determined whether or not an automatic reply is to be performed in the step S95 shown in FIG. 20. That is, the state of the automatic reply ON/OFF key at a time when the incoming notifying operation allowable list 120 is set is read from the other condition data 184 (see FIG. 15) to determine whether or not the automatic reply ON/OFF key at a time when the incoming notifying operation allowable list is set 120 (see FIG. 6(A)) is in an on-state.

If "NO" in the step S95, that is, if the automatic reply ON/OFF key at a time when the incoming notifying operation allowable list 120 is turned off, the process proceeds to the step S111 shown in FIG. 21. On the other hand, if "YES" is determined in the step S95, it is determined whether or not e-mail re-receiving is set in the step S71 shown in FIG. 19. An explanation on case that re-receiving of the e-mail message is set is made later, and "NO" is determined here. In the next step S83, it is determined whether or not the condition flag 152j is "ON". In the step S33, the condition flag 152j is turned on, that is, the address of the received e-mail message is included in the incoming notifying operation allowable list, and thus, "YES" is determined in the step S83, and in the step S85, it is determined whether or not the mobile communication terminal 10 is caused to perform an incoming call notifying operation. Since the address of the received e-mail message is included in the incoming notifying operation allowable list here, "YES" is determined in the step S85, and the process proceeds to the step S107 shown in FIG. 21.

That is, if the incoming notifying operation allowable list is set, and the address of the received e-mail message is not included in the incoming notifying operation allowable list, the processing similar to that when the domain analysis, the character code analysis and the header time difference analysis are set as conditions is performed. On the other hand, if the address of the received e-mail message is included in the incoming notifying operation allowable list, the mobile communication terminal 10 notifies the user that an e-mail message is received, and whether or not an automatic reply is performed is decided depending on the setting by the user.

Successively, an explanation is made on a case that e-mail re-receiving is set. Here, the processing in the steps S21-S33, the steps S41-S65 and the steps S91-S95 are similar to those when the domain analysis, the character code analysis and the header time difference analysis are set as conditions, and when the incoming notifying operation allowable list is set, and therefore, the detailed explanation is omitted.

Referring to FIG. 19, in the step S71, it is determined whether or not e-mail re-receiving is set. That is, if an e-mail automatic reply processing is performed, the state of the e-mail re-receiving ON/OFF key 90 is read from the other condition data 184 (see FIG. 15) to determine whether or not the e-mail re-receiving ON/OFF key 90 is turned on. Here, an explanation is made on a case that e-mail re-receiving is set is made, and thus, "YES" is determined, and in a step S73, it is determined whether or not the address of the sender is in the automatic reply list. That is, it is determined whether or not the address of the sender included in the header of the received e-mail message is stored in the automatic reply list data 178 (see FIG. 15). If "YES" is determined in the step S73, that is, if the address of the sender is stored in the automatic reply list data 178, it is determined whether or not to be within the set time for re-receiving of an e-mail in a step S75. That is, it is determined whether or not to be equal to or less than the time set to the setting time key at a time when e-mail is re-received 140 (see FIG. 7) read from the set time data at a time when e-mail is re-received 180 (see FIG. 15). If "NO" in the step S73 or the step S75, that is, if the set operation is not required to be performed on the re-received e-mail message, the process after the step S83 is performed.

Furthermore, if "YES" is determined in the step S75, that is, if the time difference between the date and time stored in the automatic reply list and the time in the time register 152n is equal to or less than the time set in the setting time key at a time when e-mail is re-received 140 (see FIG. 7), it is determined whether or not the mobile communication terminal 10 is caused to perform an incoming call notifying operation in a step S77. That is, the state of the incoming call notifying operation ON/OFF key when e-mail is re-received 144 (see FIG. 7) is read from the other condition data 184 (see FIG. 15) to determine whether or not the incoming call notifying operation ON/OFF key when e-mail is re-received 144 is turned on. If "NO" in the step S77, that is, if the incoming call notifying operation ON/OFF key when e-mail is re-received 144 is in an off-state, it is determined whether or not an automatic reply is to be performed in a step S79. That is, the state of the automatic reply ON/OFF key when e-mail is re-received 142 is read from the other condition data 184 (see FIG. 7) to determine whether or not the state of the automatic reply ON/OFF key when e-mail is re-received 142 is turned on. If "NO" in the step S79, that is, if the automatic reply ON/OFF key when an e-mail is re-received 142 is in an off-state, the process proceeds to the step S101 shown in FIG. 21. Furthermore, if "YES" is determined in the step S79, that is, if the automatic reply ON/OFF key when e-mail is re-received 142 is in an on-state, the processing after the step S103 shown in FIG. 21 is performed.

Here, if "YES" is determined in the step S77, that is, if the incoming call notifying operation ON/OFF key when e-mail is re-received 144 is in an on-state, it is determined whether or not an automatic reply is performed similar to the processing in the step S79 in a step S81. That is, it is determined whether or not the automatic reply ON/OFF key when e-mail is re-received 142 is in an on-state. If "YES" is determined in the step S81, that is, if the automatic reply ON/OFF key when e-mail is re-received 142 is in an on-state, the processing after the step S107 in FIG. 21 is performed. On the other hand, if "NO" in the step S81, that is, if the automatic reply ON/OFF key when e-mail is re-received 142 is in an off-state, the process proceeds to the step S111 shown in FIG. 21.

That is, in a case that e-mail receiving is set, an automatic reply or an incoming call notifying operation can be set to be performed regardless of the operation when the domain analysis, the character code analysis and the header time difference analysis are set as conditions or the operation when the incoming notifying operation allowable list is set. Furthermore, if an automatic reply or an incoming call notifying operation is set not to be performed in response to an e-mail message being re-received, it is possible to prevent a reply mail from being sent to the same reply partner again and again.

As understood from the above-described explanation, the mobile communication terminal 10 is set as to the allowable time difference, the incoming call notifying operation and the e-mail automatic reply by the e-mail automatic reply function, and performs a domain analysis, etc. on the header information of the received e-mail message if the setting is valid. Then, in the domain analysis, it is determined whether or not the time difference between the region set by the roaming function and the region from which an e-mail message is sent is equal to or less than the allowable time difference. If it is equal to or less than the allowable time difference, the mobile communication terminal 10 notifies that an e-mail message is received by an incoming call notifying operation. On the other hand, if it is larger than the allowable time difference, the mobile communication terminal 10 automatically sends a reply mail without notifying receipt of the e-mail message.

Thus, the mobile communication terminal 10 can select whether or not an e-mail receipt notifying operation is to be performed on the basis of the time difference between the region in which an-email message is received and the region from which the received e-mail message is sent. Thus, the user can causes the mobile communication terminal 10 to notify the receipt of an e-mail message or not to notify the reception depending on where the e-mail message is sent from.

Additionally, in this embodiment, it is needless to say that the communication system of the mobile communication terminal 10 can adopt a PHS system over the CDMA system, the W-CDMA system, and the TDMA system. Furthermore, this invention may be applied to a handheld terminal, such as a PDA (Personal Digital Assistant) which sends and receives e-mail messages and outputs an incoming call tone in response to an e-mail message being received over the mobile communication terminal 10.

In addition, in the above-described embodiment, by analyzing header information of the e-mail message, the time difference between the area (region) set by the roaming function and the region from which an e-mail message is sent is obtained, but by analyzing other parts of an e-mail message, for example, the text, and by analyzing the information of file data attached to the e-mail message, the time difference may be evaluated. Accordingly, it should be understood that the term "e-mail message" includes all of them.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A mobile communication terminal comprising:
 at least one central processing unit;
 a memory which stores a set time difference; and
 at least one program that, when executed by the at least one central processing unit,
  receives an e-mail message,
  determines a receiving region for said e-mail message,
  analyzes a header of the e-mail message to determine a sending region from which said e-mail message was sent,
  determines a time difference between said receiving region and said sending region, and
  determines whether or not to provide notification of the receipt of said e-mail message based on the time difference, wherein it is determined to provide notification of the receipt of said e-mail message when the determined time difference is equal to or less than the set time difference stored in said memory.
2. A mobile communication terminal according to claim 1, wherein said determination of the sending region is based on domain information included in said header of the e-mail message.
3. The mobile communication terminal according to claim 2, wherein determining the sending region based on the domain information included in said header of the e-mail message comprises inferring a country from a top-level domain associated with an e-mail address of a sender of the e-mail message.
4. A mobile communication terminal according to claim 1, wherein said determination of the sending region is based on a character code included in said header of the e-mail message.
5. The mobile communication terminal according to claim 4, wherein determining the sending region based on the character code included in said header of the e-mail message comprises inferring a country from a character encoding scheme represented by the character code.
6. A mobile communication terminal according to claim 1, wherein said determination of the sending region is based on time difference information with respect to a universal time included in said header of the e-mail message.
7. A mobile communication terminal according to claim 1, further comprising a memory which stores a list of sender information, and wherein said determination of whether or not to provide notification of the receipt of said e-mail message is further based on whether or not sender information of said e-mail message is included in said list of sender information.
8. The mobile communication terminal according to claim 7, wherein the at least one program:
 receives the list of sender information from one or more input operations performed by a user of the mobile communication terminal; and
 stores the list of sender information in the memory.
9. A mobile communication terminal according to claim 1, further comprising a memory which stores a set time, and wherein said analysis of said header of the e-mail message is performed in response to a determination that a receiving time of said e-mail message is within said set time.
10. A mobile communication terminal according to claim 1, wherein said at least one program further automatically sends a reply in response to said e-mail message when it is determined not to provide notification of the receipt of said e-mail message.
11. A mobile communication terminal according to claim 10, further comprising a memory which stores reply partner information, and wherein said at least one program sends said reply mail when sender information of said e-mail message is not included in said reply partner information stored in said memory.
12. The mobile communication terminal according to claim 1, wherein the at least one program:
 receives the set time difference from an input operation performed by a user of the mobile communication terminal; and
 stores the set time difference in the memory.
13. A non-transitory computer-readable storage medium storing a mail controlling program that, when executed by a central processing unit, causes said central processing unit to:
 determine a receiving region for a received e-mail message;
 analyze a header of the e-mail message to determine a sending region from which said e-mail message was sent;
 determine a time difference between said receiving region and said sending region; and
 determine whether or not to provide notification of a receipt of said e-mail message based on the time difference, wherein it is determined to provide notification of the receipt of said e-mail message when the determined time difference is equal to or less than a set time difference stored in a memory.

14. A mail controlling method of a mobile communication terminal, the method comprising using a processor of said mobile communication terminal to:
- determine a receiving region for a received e-mail message;
- analyze a header of the e-mail message to determine a sending region from which said e-mail message was sent;
- determine a time difference between said receiving region and said sending region; and
- determine whether or not to provide notification of a receipt of said e-mail message based on the time difference, wherein it is determined to provide notification of the receipt of said e-mail message when the determined time difference is equal to or less than a set time difference stored in a memory.

* * * * *